(12) United States Patent
Yokoo

(10) Patent No.: US 9,930,305 B2
(45) Date of Patent: Mar. 27, 2018

(54) DISCHARGE LAMP DRIVING DEVICE, PROJECTOR, AND DISCHARGE LAMP DRIVING METHOD

(71) Applicant: SEIKO EPSON CORPORATION, Tokyo (JP)

(72) Inventor: Tomohiro Yokoo, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/474,085

(22) Filed: Mar. 30, 2017

(65) Prior Publication Data

US 2017/0295350 A1 Oct. 12, 2017

(30) Foreign Application Priority Data

Apr. 6, 2016 (JP) .................... 2016-076369

(51) Int. Cl.
*H04N 9/31* (2006.01)
*G03B 21/20* (2006.01)
*H05B 41/36* (2006.01)
*H05B 41/02* (2006.01)
*H05B 41/24* (2006.01)
*H05B 41/292* (2006.01)

(52) U.S. Cl.
CPC ....... *H04N 9/3155* (2013.01); *G03B 21/2026* (2013.01); *H05B 41/02* (2013.01); *H05B 41/24* (2013.01); *H05B 41/2928* (2013.01); *H05B 41/36* (2013.01)

(58) Field of Classification Search
CPC ........ H05B 41/00; H05B 41/02; H05B 41/24; H05B 41/36; H05B 41/2928; G03B 21/2026; G03B 21/2006; G03B 21/2053
See application file for complete search history.

(56) References Cited

U.S. PATENT DOCUMENTS

| 7,023,144 | B2 | 4/2006 | Suzuki et al. | |
| 8,120,282 | B2* | 2/2012 | Yamauchi | H05B 41/2928 315/247 |
| 8,378,581 | B2* | 2/2013 | Terashima | H05B 41/2928 315/246 |
| 8,400,068 | B2* | 3/2013 | Terashima | H05B 41/2883 315/246 |
| 9,785,041 | B2* | 10/2017 | Sato | G03B 21/2053 |
| 2005/0206326 | A1 | 9/2005 | Suzuki et al. | |
| 2017/0076645 | A1* | 3/2017 | Terashima | H05B 41/36 |
| 2017/0295350 | A1* | 10/2017 | Yokoo | G03B 21/2026 |

FOREIGN PATENT DOCUMENTS

JP 2006059790 A 3/2006

\* cited by examiner

*Primary Examiner* — William C Dowling
(74) *Attorney, Agent, or Firm* — Oliff PLC

(57) ABSTRACT

A discharge lamp driving device includes a discharge lamp driving unit configured to supply a driving current to a discharge lamp, and a control unit configured to control the discharge lamp driving unit. The discharge lamp driving device is configured to provide a first hybrid period and a second hybrid period each alternately including a first AC period in which an AC current is supplied and a first DC period in which a DC current with a first polarity is supplied. The control unit, in the first hybrid period, is configured to change a ratio of length of the first DC period to length of the first AC period to be increased, and in the second hybrid period, is configured to change a ratio of the length of the first AC period to the length of the first DC period to be increased.

19 Claims, 12 Drawing Sheets

DISCHARGE LAMP DRIVING DEVICE, PROJECTOR, AND DISCHARGE LAMP DRIVING METHOD

BACKGROUND

1. Technical Field

The present invention relates to a discharge lamp driving device, a light source device, a projector, and a discharge lamp driving method.

2. Related Art

For example, JP-A-2006-59790 discloses a high pressure discharge lamp lighting device in which an AC current is supplied to a high pressure discharge lamp.

Meanwhile, devitrification may be one of causes of reducing the illuminance of a discharge lamp. The devitrification is a phenomenon in which a light emitting tube inner wall of the discharge lamp is heated to be crystallized, and thus turns to a milky clouded state. The light transmittance of a portion devitrified in the light emitting tube is reduced, and, as a result, the illuminance of the discharge lamp is reduced. Consequently, there is a problem in that the service life of the discharge lamp is shortened.

SUMMARY

An advantage of some aspects of the invention is to provide a discharge lamp driving device capable of preventing the occurrence of devitrification, a light source device having the discharge lamp driving device, and a projector having the light source device. Another advantage of some aspects of the invention is to provide a discharge lamp driving method capable of preventing the occurrence of devitrification.

A discharge lamp driving device according to an aspect of the invention includes a discharge lamp driving unit configured to supply a driving current to a discharge lamp provided with a first electrode and a second electrode; and a control unit configured to control the discharge lamp driving unit, in which the discharge lamp driving device is configured to provide a first hybrid period and a second hybrid period each alternately including a first AC period in which an AC current is supplied to the discharge lamp and a first DC period in which a DC current with a first polarity is supplied to the discharge lamp, and the control unit, in the first hybrid period, is configured to change a ratio of length of the first DC period to length of the first AC period to be increased, and in the second hybrid period, is configured to change a ratio of the length of the first AC period to the length of the first DC period to be increased.

According to the discharge lamp driving device of the aspect of the invention, the ratio of the length of the first DC period to the length of the first AC period in the first hybrid period is increased, and thus it is possible to increase an arc flare angle in the first hybrid period. On the other hand, the ratio of the length of the first AC period to the length of the first DC period in the second hybrid period is increased, and thus it is possible to decrease an arc flare angle in the second hybrid period. Consequently, the first hybrid period and the second hybrid period are provided, and thus an arc flare angle can be changed. Therefore, it is possible to change a location which is most heated in the internal wall of a light emitting tube of the discharge lamp and thus to prevent a part of the inner wall of the light emitting tube from being excessively heated. As a result, it is possible to prevent the occurrence of denitrification.

According to the discharge lamp driving device of the aspect of the invention, in the first hybrid period, the first DC period and the first AC period are alternately provided, and thus an arc flare angle is increased as a whole while alternately repeating an increase and a reduction of the arc flare angle. Thus, it is possible to prevent a variation in the angular velocity of the arc flare angle in the first hybrid period. In the second hybrid period, the first DC period and the first AC period are alternately provided, and thus an arc flare angle is reduced as a whole while alternately repeating an increase and a reduction of the arc flare angle. Thus, it is possible to prevent a variation in the angular velocity of the arc flare angle in the second hybrid period. Therefore, it is possible to prevent a variation in the time required for an inner wall of the light emitting tube to be most heated and thus to further prevent the occurrence of denitrification.

The discharge lamp driving device may be configured such that the control unit is configured to change the length of the first DC period to be increased in the first hybrid period.

According to this configuration, it is possible to increase an average value of angular velocities of an arc flare angle in the first hybrid period and thus to reduce the time required for each portion of the inner wall of the light emitting tube to be most heated.

The discharge lamp driving device may be configured such that the control unit is configured to change the length of the first AC period to be increased in the second hybrid period.

According to this configuration, it is possible to increase an average value of angular velocities of an arc flare angle in the second hybrid period and thus to reduce the time required for each portion of the inner wall of the light emitting tube to be most heated.

The discharge lamp driving device may be configured such that, in the first hybrid period, the length of the first DC period is equal to or larger than the length of the first AC period.

According to this configuration, it is possible to easily increase an arc flare angle in the first hybrid period.

The discharge lamp driving device may be configured such that, in the second hybrid period, the length of the first AC period is equal to or larger than the length of the first DC period.

According to this configuration, it is possible to easily reduce an arc flare angle in the second hybrid period.

The discharge lamp driving device may be configured such that the second hybrid period is provided sequentially right after the first hybrid period.

According to this configuration, an arc flare angle can be reduced in the second hybrid period right after the arc flare angle is increased in the first hybrid period. Thus, it is possible to reduce the time required for a portion of the inner wall of the light emitting tube to be most heated in a state in which an arc flare is inclined.

The discharge lamp driving device may be configured such that a period initially provided and a period provided last in the first hybrid period are the first DC period, and a period initially provided and a period provided last in the second hybrid period are the first AC period.

According to this configuration, it is possible to appropriately change an arc flare angle.

The discharge lamp driving device may be configured such that the discharge lamp driving device is configured to provide a third hybrid period and a fourth hybrid period each alternately including a second AC period in which an AC current is supplied to the discharge lamp and a second DC period in which a DC current with a second polarity opposite to the first polarity is supplied to the discharge lamp, and the control unit, in the third hybrid period, is configured to change a ratio of length of the second DC period to length of the second AC period to be increased, and in the fourth hybrid period, is configured to change a ratio of the length of the second AC period to the length of the second DC period to be increased.

According to this configuration, an arc flare angle can be inclined toward both of the first electrode side and the second electrode side, and it is possible to prevent a variation in the angular velocity of the arc flare angle in both of the cases. Therefore, it is possible to further prevent the occurrence of denitrification.

The discharge lamp driving device may be configured such that the discharge lamp driving device is configured to alternately provide a first period composed of the first hybrid period and the second hybrid period, the second hybrid period provided sequentially right after the first hybrid period, and a second period composed of the third hybrid period and the fourth hybrid period, the fourth hybrid period provided sequentially right after the third hybrid period.

According to this configuration, it is possible to periodically change an arc flare angle and thus to further prevent the occurrence of devitrification.

A light source device according to another aspect of the invention includes a discharge lamp configured to emit light; and the discharge lamp driving device described above.

The light source device of the aspect of the invention is provided with the discharge lamp driving device, and thus it is possible to prevent the occurrence of devitrification.

A projector according to another aspect of the invention includes the light source device described above; a light modulation device configured to modulate light emitted from the light source device according to an image signal; and a projection optical system configured to project light modulated by the light modulation device.

The projector of the aspect of the invention is provided with the light source device, and thus it is possible to prevent the occurrence of devitrification.

A discharge lamp driving method according to another aspect of the invention for supplying a driving current to a discharge lamp provided with a first electrode and a second electrode and driving the discharge lamp includes supplying the discharge lamp with the driving current having a first hybrid period and a second hybrid period each alternately including a first AC period in which an AC current is supplied to the discharge lamp and a first DC period in which a DC current with a first polarity is supplied to the discharge lamp, in which in the first hybrid period, a ratio of length of the first DC period to length of the first AC period is changed to be increased, and in the second hybrid period, a ratio of the length of the first AC period to the length of the first DC period is changed to be increased.

According to the discharge lamp driving method of the aspect of the invention, it is possible to prevent the occurrence of denitrification in the above-described same manner.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, with reference to the drawings, a projector according to embodiments of the invention will be described.

The scope of the invention is not limited to the following embodiments, and can be arbitrarily changed within the scope of the technical spirit of the invention. In the following drawings, for better understanding of each constituent element, a scale, the number, and the like thereof in each structure may be different from a scale, the number, and the like thereof in an actual structure.

Figure 1:
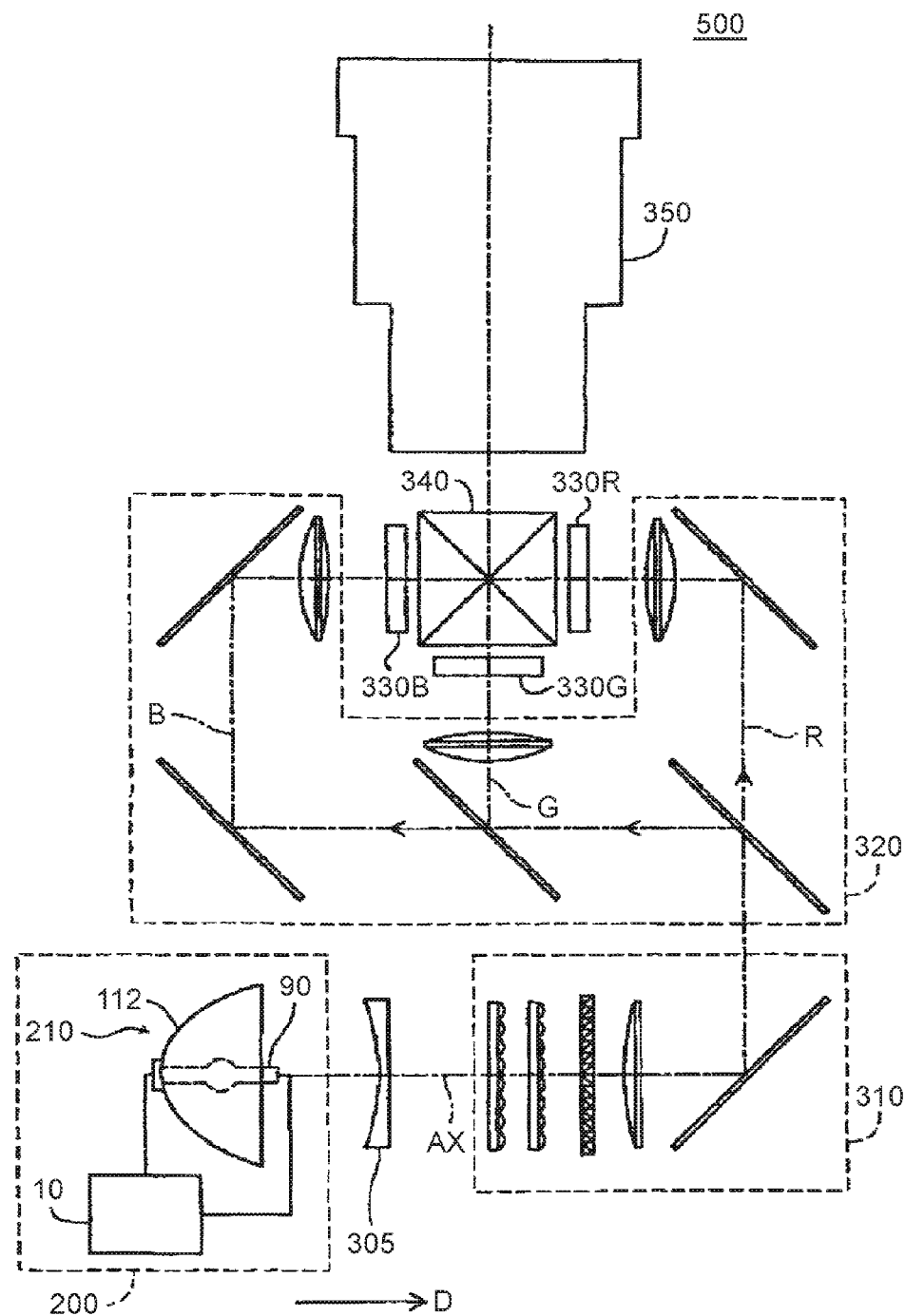
FIG. 1 is a schematic configuration diagram illustrating a projector according to the present embodiment.

FIG. 1 is a schematic configuration diagram illustrating a projector 500 of the present embodiment. As illustrated in FIG. 1, the projector 500 of the present embodiment includes a light source device 200, a collimating lens 305, an illumination optical system 310, a color separation optical system 320, three liquid crystal light valves (light modulation devices) 330R, 330G and 330B, a cross dichroic prism 340, and a projection optical system 350.

Light emitted from the light source device 200 passes through the collimating lens 305 and is incident to the illumination optical system 310. The collimating lens 305 collimates the light from the light source device 200.

The illumination optical system 310 adjusts the illuminance of the light emitted from the light source device 200 so that the illuminance is uniformized on the liquid crystal light valves 330R, 330G and 330B. The illumination optical system 310 aligns polarization directions of the light emitted from the light source device 200 in one direction. This is aimed at effectively using the light emitted from the light source device 200 in the liquid crystal light valves 330R, 330G and 330B.

The light having undergone the adjustment of the illuminance distribution and the polarization directions is incident to the color separation optical system 320. The color separation optical system 320 separates the incident light into three color light beams including red light (R), green light (G), and blue light (B). The three color light beams are respectively modulated according to video signals by the liquid crystal light valves 330R, 330G and 330B which correspond to the respective color light beams. The liquid crystal light valves 330R, 330G and 330B respectively include liquid crystal panels 560R, 560G and 560B which will be described later, and polarization plates (not illustrated). The polarization plates are disposed on a light incidence side and a light emission side of each of the liquid crystal panels 560R, 560G and 560B.

The three modulated color light beams are combined with each other by the cross dichroic prism 340. The combined light is incident to the projection optical system 350. The projection optical system. 350 projects the incident light onto a screen 700 (refer to FIG. 6). Thus, a video is displayed on the screen 700. Well-known configurations may be employed as configurations of the collimating lens 305, the illumination optical system 310, the color separation optical system 320, the cross dichroic prism 340, and the projection optical system 350.

Figure 2:
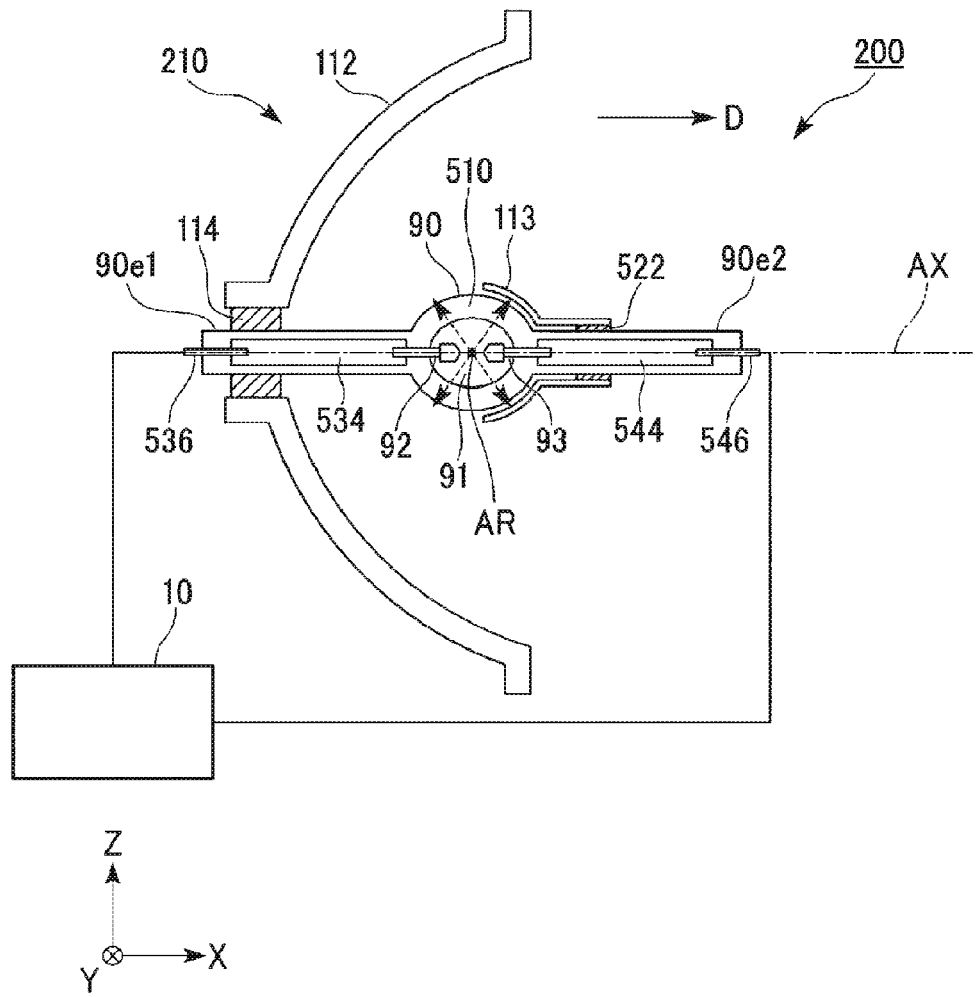
FIG. 2 is a sectional view of a discharge lamp in the present embodiment.

FIG. 2 is a sectional view illustrating a configuration of the light source device 200. FIG. 2 is a sectional view of a light source unit 210. In FIG. 2, an XYZ coordinate system is used as a three-dimensional orthogonal coordinate system. In the XYZ coordinate system, an X axis direction is a direction which is parallel to a direction in which a first electrode 92 and a second electrode 93 face each other, that is, a leftward-and-rightward direction in FIG. 2. A Z axis direction is a direction which is orthogonal to the direction (X axis direction) in which the first electrode 92 and the second electrode 93 face each other, and is parallel to a plane including the direction in which the first electrode 92 and the second electrode 93 face each other and a vertical direction. A Y axis direction is a direction which is orthogonal to the X axis direction and the Z axis direction.

In the present embodiment, the Z axis direction is parallel to, for example, the vertical direction. Thus, in the following description, a positive side (+Z side) of the Z axis direction is set to a vertical direction upper side, and a negative side (−Z side) of the Z axis direction is set to a vertical direction lower side. This is also the same for FIGS. 3, 4, 5, 11 and 12 which will be described later. In the following description, the X axis direction will be simply referred to as a facing direction, and the Z axis direction will be simply referred to as an orthogonal direction, in some cases.

As illustrated in FIG. 2, the light source device 200 includes a light source unit 210 and a discharge lamp lighting device (discharge lamp driving device) 10. The light source unit 210 includes a discharge lamp 90, a main reflection mirror 112, and a subsidiary reflection mirror 50.

The discharge lamp lighting device 10 supplies a driving current I to the discharge lamp 90 so as to light the discharge lamp 90. The main reflection mirror 112 reflects light emitted from the discharge lamp 90 in an irradiation direction D. The irradiation direction D is parallel to an optical axis AX of the discharge lamp 90. The irradiation direction D is parallel to, for example, the facing direction (X axis direction).

The discharge lamp 90 includes a light emitting tube 510, the first electrode 92, and the second electrode 93.

The light emitting tube 510 has a rod shape extending in the irradiation direction D. One end of the light emitting tube 510, that is, one end of the discharge lamp 90 is referred to as a first end 90e1. The other end of the light emitting tube 510, that is, the other end of the discharge lamp 90 is referred to as a second end 90e2. A material of the light emitting tube 510 is, for example, a light transmissive material such as quartz glass. A central portion of the light emitting tube 510 is swollen in a spherical shape, and the inside thereof is a discharge space 91. A gas which is a discharge medium containing mercury, rare gases, metal halogen compounds, and the like is enclosed in the discharge space 91.

Tips of the first electrode 92 and the second electrode 93 protrude in the discharge space 91. The first electrode 92 is disposed on the first end 90e1 side of the discharge space 91. The second electrode 93 is disposed on the second end 90e2 side of the discharge space 91. Each of the first electrode 92 and the second electrode 93 has a rod shape extending in the optical axis AX. The tips of the first electrode 92 and the second electrode 93 are disposed to face each other with a predetermined distance in the discharge space 91. A material of each of the first electrode 92 and the second electrode 93 is, for example, a metal such as tungsten.

Figure 3:
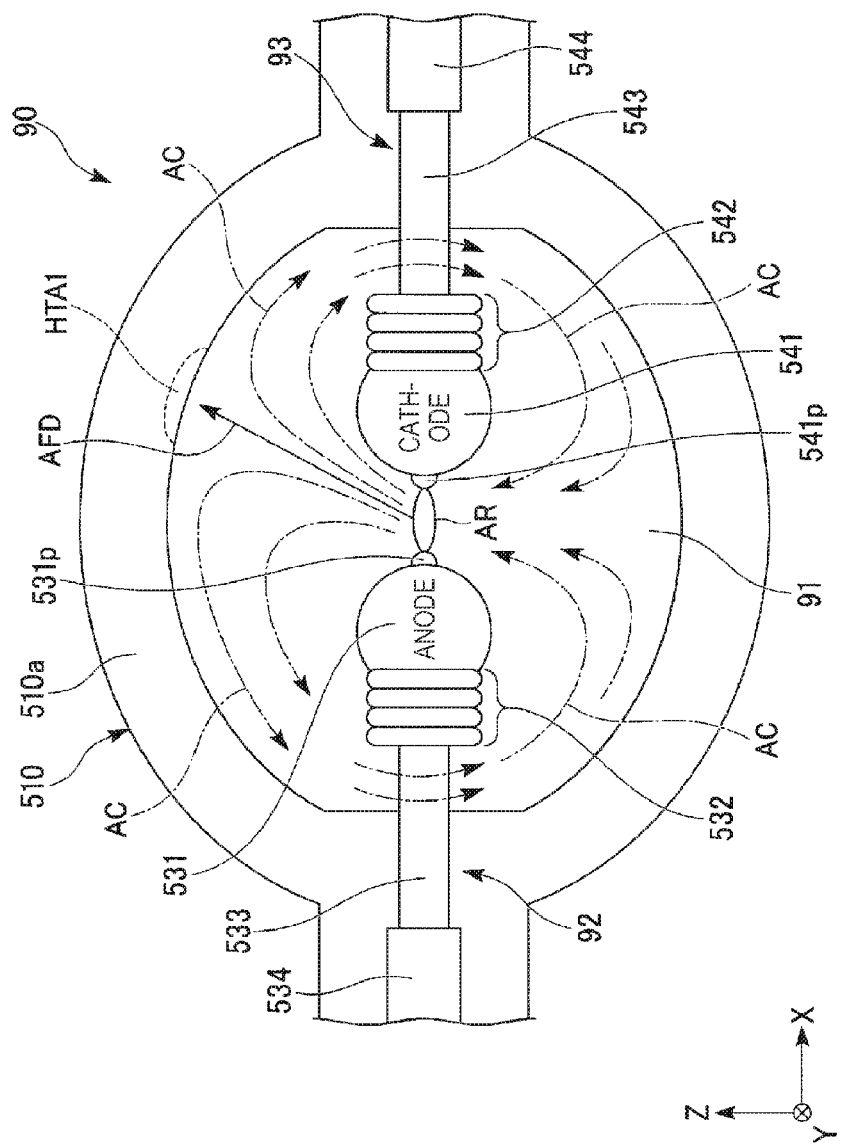
FIG. 3 is a partially enlarged sectional view of the discharge lamp in the present embodiment.
Figure 4:
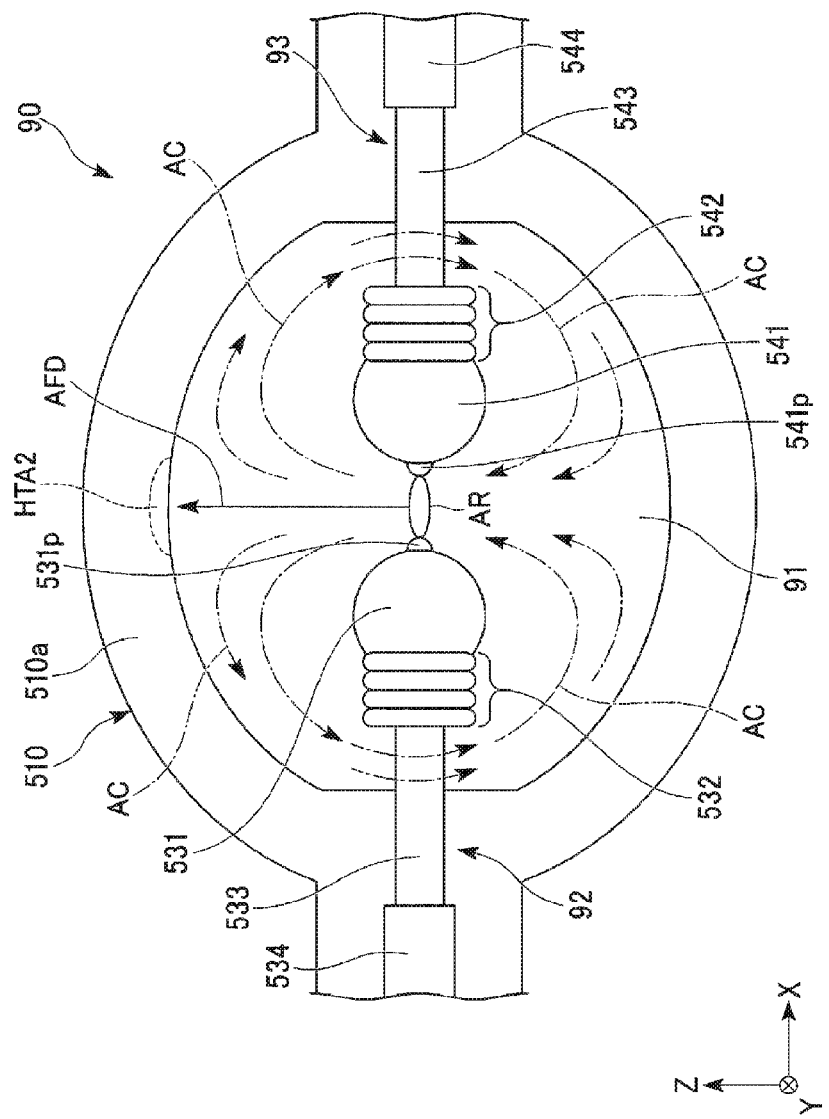
FIG. 4 is a partially enlarged sectional view of the discharge lamp in the present embodiment.
Figure 5:
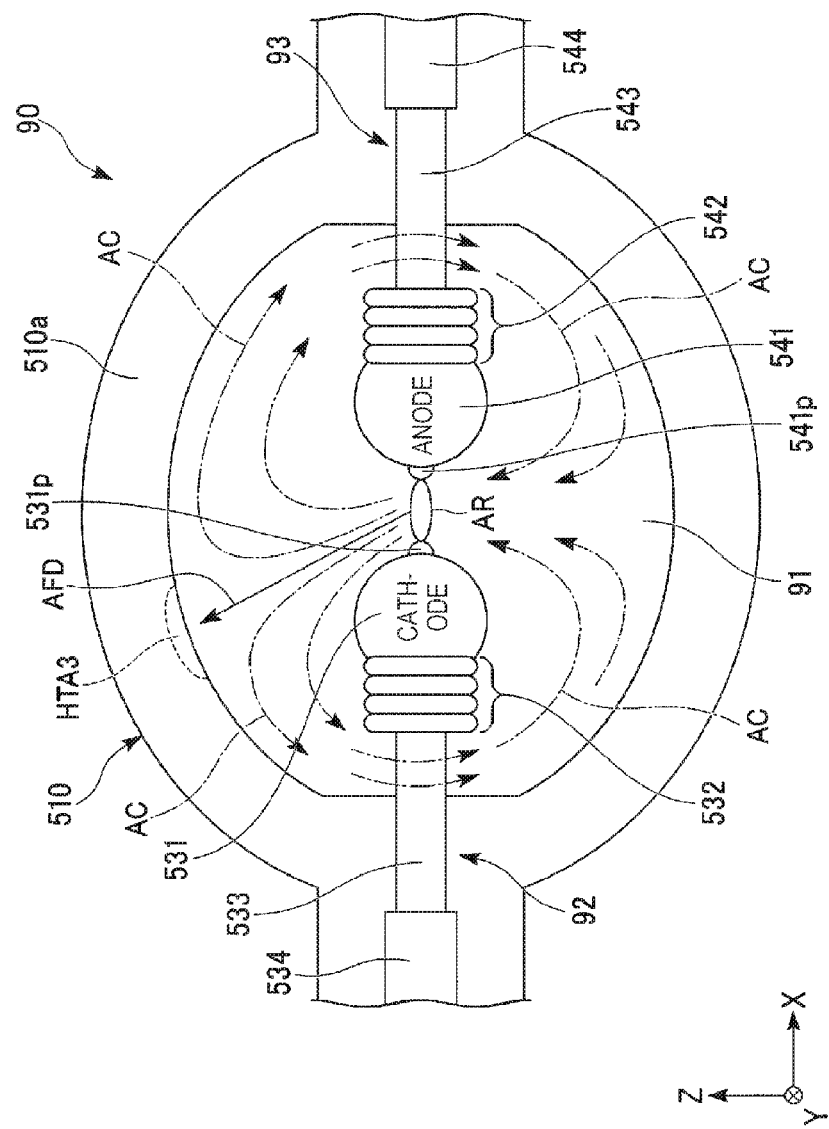
FIG. 5 is a partially enlarged sectional view of the discharge lamp in the present embodiment.

FIGS. 3 to 5 are enlarged sectional views illustrating a portion of the discharge lamp 90. FIG. 3 is a diagram illustrating a state in which an arc flare direction AFD which will be described later is inclined toward the second electrode 93 side (+X side). FIG. 4 is a diagram illustrating a state in which the arc flare direction AFD is not inclined. FIG. 5 is a diagram illustrating a state in which the arc flare direction AFD is inclined toward the first electrode 92 side (−X side).

As illustrated in FIGS. 3 to 5, the first electrode 92 has a core rod 533, a coil portion 532, a main body portion 531, and a protrusion 531p. The coil portion 532 is formed by winding a wire of an electrode material (tungsten or the like) on the core rod 533, and the first electrode 92 is formed by heating and melting the formed coil portion 532, in a stage before being enclosed in the light emitting tube 510. Consequently, the main body portion 531 having large thermal capacity and the protrusion 531p where arc discharge AR is generated are formed on the tip side of the first electrode 92.

The second electrode 93 has a core rod 543, a coil portion 542, a main body portion 541, and a protrusion 541p. The second electrode 93 is formed in the same manner as the first electrode 92.

The first electrode 92 and the second electrode 93 have the same configuration, and, thus, in the following description, only the first electrode 92 will be described as a representative in some cases. The protrusion 531p of the first electrode 92 and the protrusion 541p of the second electrode 93 have the same configuration, and, thus, in the following description, only the protrusion 531p will be described as a representative in some cases.

As illustrated in FIG. 2, a first terminal 536 is provided at the first end 90e1 of the discharge lamp 90. The first terminal 536 and the first electrode 92 are electrically connected to each other via a conductive member 534 which penetrates through the discharge lamp 90. Similarly, a second terminal 546 is provided at the second end 90e2 of the discharge lamp 90. The second terminal 546 and the second electrode 93 are electrically connected to each other via a conductive member 544 which penetrates through the discharge lamp 90. A material of each of the first terminal 536 and the second terminal 546 is, for example, a metal such as tungsten. As a material of each of the conductive members 534 and 544, for example, a molybdenum foil is used.

The first terminal 536 and the second terminal 546 are connected to the discharge lamp lighting device 10. The discharge lamp lighting device 10 supplies the driving power for driving the discharge lamp 90 to the first terminal 536 and the second terminal 546. As a result, arc discharge AR occurs between the first electrode 92 and the second electrode 93. Light (discharge light) generated due to the arc discharge AR is radiated in all directions from the discharge position as indicated by dashed arrows.

As illustrated in FIGS. 3 to 5, if the discharge lamp 90 is lit, a gas enclosed in the discharge space 91 is heated due to occurrence of the arc discharge AR and undergoes convection in the discharge space 91. Specifically, since the temperatures of the arc discharge AR and a region therearound are considerably high, convections AC (indicated by a dot chain arrow) which flow vertically upward (+Z side) from the arc discharge AR are generated in the discharge space 91. The convections AC come into contact with an inner wall of the light emitting tube 510, move along the inner wall of the light emitting tube 510, and are cooled as a result of passing through the core rods 533 and 543 of the first electrode 92 and the second electrode 93 and descend.

The descending convections AC further descend along the inner wall of the light emitting tube 510, but come into contact with each other on a vertically lower side of the arc discharge AR, and thus ascend so as to return to the upper arc discharge AR. As a result of the convections AC moving along the inner wall of the light emitting tube 510, the light emitting tube 510 is heated.

FIG. 3 illustrates a first polarity state in which the first electrode 92 operates as an anode, and the second electrode 93 operates as a cathode. In the first polarity state, electrons move from the second electrode 93 (cathode) to the first electrode 92 (anode) due to discharge. The electrons are discharged from the cathode (second electrode 93). The electrons discharged from the cathode (second electrode 93) collide with the tip of the anode (first electrode 92). Heat is generated due to the collision, and thus the temperature of the tip (protrusion 531$p$) of the anode (first electrode 92) increases.

FIG. 5 illustrates a second polarity state in which the first electrode 92 operates as a cathode, and the second electrode 93 operates as an anode. Contrary to the first polarity state, in the second polarity state, electrons move from the first electrode 92 to the second electrode 93. As a result, the temperature of the tip (protrusion 541$p$) of the second electrode 93 increases.

As mentioned above, when the driving current I is supplied to the discharge lamp 90, the temperature of the anode with which the electrons collide increases. On the other hand, the temperature of the cathode which emits the electrons decreases during emission of the electrons toward the anode.

An inter-electrode distance between the first electrode 92 and the second electrode 93 increases due to deterioration in the protrusions 531$p$ and 541$p$. This is because the protrusions 531$p$ and 541$p$ wear. If the inter-electrode distance increases, resistance between the first electrode 92 and the second electrode 93 increases, and thus a lamp voltage V1$a$ also increases. Therefore, by referring to the lamp voltage V1$a$, it is possible to detect a change in the inter-electrode distance, that is, the extent of deterioration in the discharge lamp 90.

As illustrated in FIG. 2, the main reflection mirror 112 is fixed to the first end 90$e$1 of the discharge lamp 90 via a fixation member 114. The main reflection mirror 112 reflects light which travels toward an opposite side to the irradiation direction D among discharge light beams, in the irradiation direction D. A shape of a reflection surface (a surface on the discharge lamp 90 side) of the main reflection mirror 112 is not particularly limited within a range in which discharge light can be reflected in the irradiation direction D, and may be, for example, a spheroidal shape or a rotating parabolic shape. For example, in a case where a shape of the reflection surface of the main reflection mirror 112 is a rotating parabolic shape, the main reflection mirror 112 can convert discharge light into light which is substantially parallel to the optical axis AX. Consequently, the collimating lens 305 can be omitted.

The subsidiary reflection mirror 50 is fixed to the second end 90$e$2 side of the discharge lamp 90 via a fixation member 522. A shape of a reflection surface (a surface on the discharge lamp 90 side) of the subsidiary reflection mirror 50 is a spherical shape which surrounds a portion of the discharge space 91 on the second end 90$e$2 side. The subsidiary reflection mirror 50 reflects light which travels toward an opposite side to the side on which the main reflection mirror 112 is disposed among the discharge light beams, toward the main reflection mirror 112. Consequently, it is possible to increase usage efficiency of the light radiated from the discharge space 91.

A material of each of the fixation members 114 and 522 is not particularly limited as long as the material is a heat resistant material which can resist heat generated from the discharge lamp 90, and is, for example, an inorganic adhesive.

Hereinafter, a circuit configuration of the projector 500 will be described.

Figure 6:
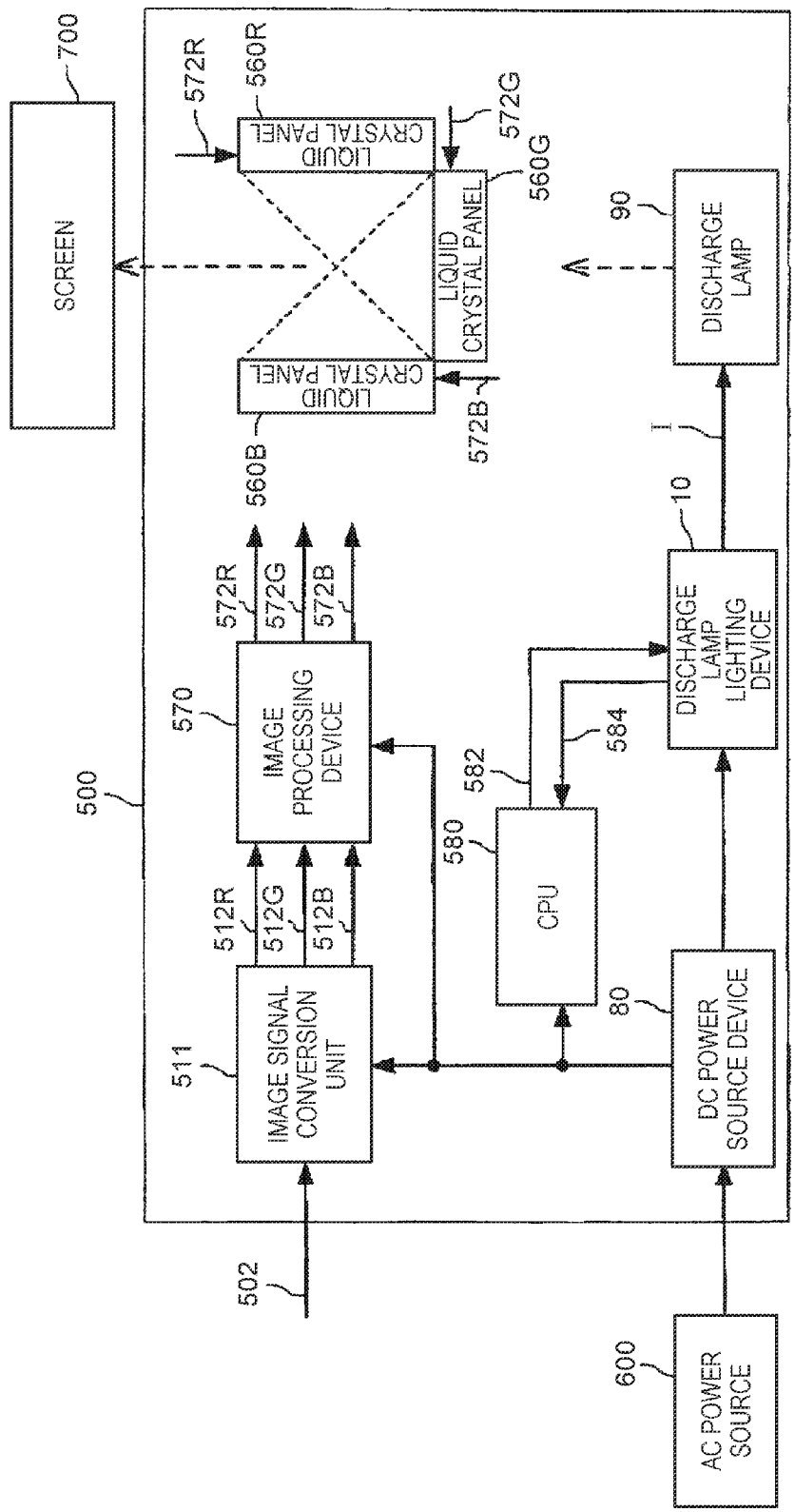
FIG. 6 is a block diagram illustrating various constituent elements of the projector according to the present embodiment.

FIG. 6 is a diagram illustrating an example of a circuit configuration of the projector 500 according to the present embodiment. The projector 500 includes an image signal conversion unit 511, a DC power source device 80, the liquid crystal panels 560R, 560G and 560B, an image processing device 570, and a central processing unit (CPU) 580, in addition to the optical systems illustrated in FIG. 1.

The image signal conversion unit 511 converts image signals 502 (luminance-color difference signals, analog RGB signals, or the like) which are input from an external device into digital RGB signals with a predetermined word length so as to generate image signals 512R, 512G and 512B which are then supplied to the image processing device 570.

The image processing device 570 performs an image process on each of the three image signals 512R, 512G and 512B. The image processing device 570 supplies driving signals 572R, 572G and 572B for respectively driving the liquid crystal panels 560R, 560G and 560B, to the liquid crystal panels 560R, 560G and 560B.

The DC power source device 80 converts an AC voltage supplied from an external AC power source 600 into a constant DC voltage. The DC power source device 80 supplies DC voltages to the image signal conversion unit 511 and the image processing device 570 located on a secondary side of a transformer (not illustrated but included in the DC power source device 80) and the discharge lamp lighting device 10 located on a primary side of the transformer.

The discharge lamp lighting device 10 generates a high voltage between the electrodes of the discharge lamp 90 so as to cause dielectric breakdown and thus generate a discharge path during activation. Thereafter, the discharge lamp lighting device 10 supplies the driving current I for the discharge lamp 90 maintaining discharge.

The liquid crystal panels 560R, 560G and 560B are respectively provided in the above-described liquid crystal light valves 330R, 330G and 330B. The liquid crystal panels 560R, 560G and 560B modulate transmittance (luminance) of the color light beams which are respectively incident to the liquid crystal panels 560R, 560G and 560B via the above-described optical systems on the basis of the respective driving signals 572R, 572G and 572B.

The CPU 580 controls various operations from starting of lighting of the projector 500 to putting-out thereof. For example, in the example illustrated in FIG. 6, a lighting command or a putting-out command is output to the discharge lamp lighting device 10 via a communication signal 582. The CPU 580 receives lighting information of the discharge lamp 90 from the discharge lamp lighting device 10 via a communication signal 584.

Hereinafter, a description will be made of a circuit configuration of the discharge lamp lighting device 10.

Figure 7:
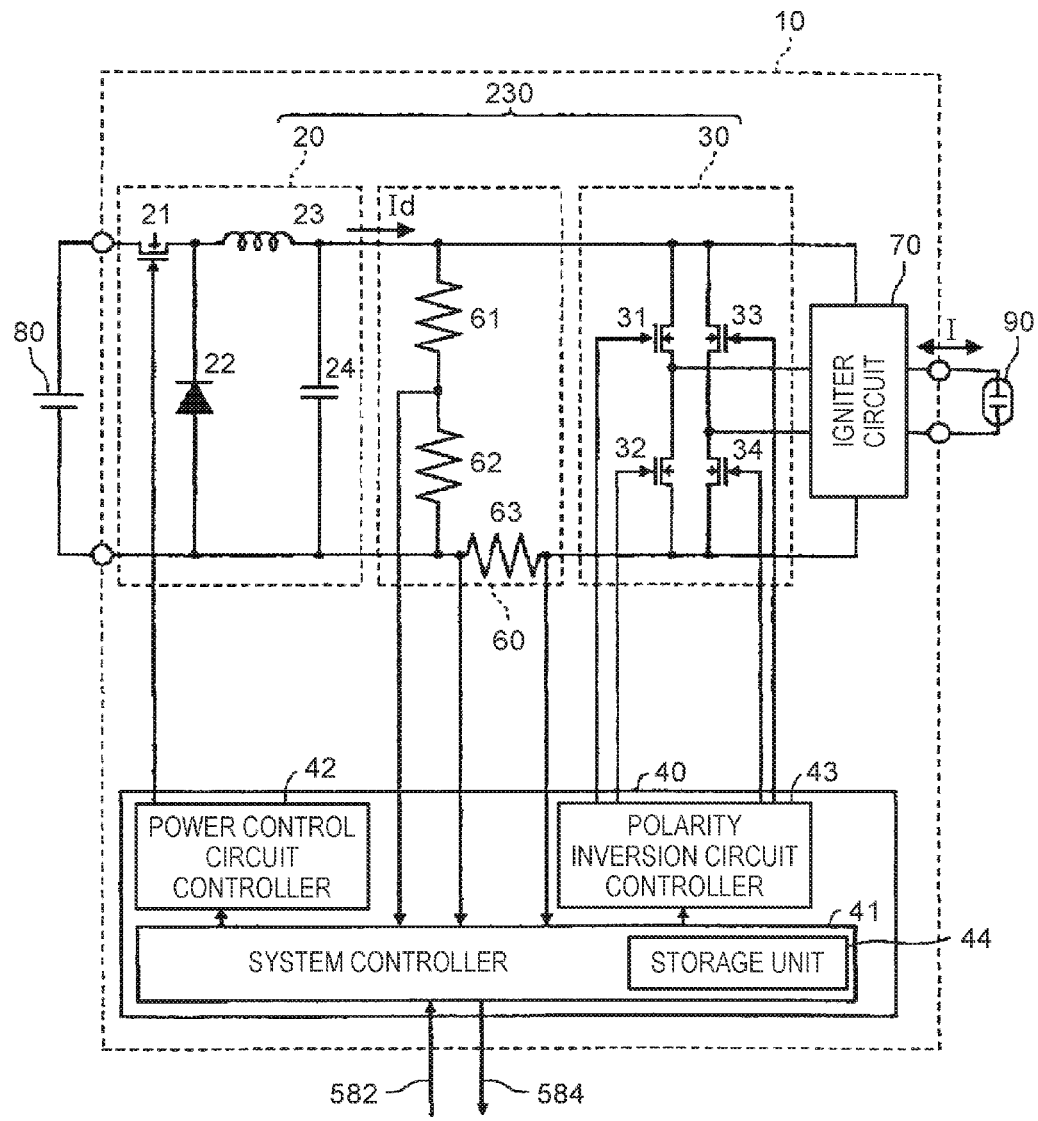
FIG. 7 is a circuit diagram illustrating a discharge lamp lighting device according to the present embodiment.

FIG. 7 is a diagram illustrating an example of a circuit configuration of the discharge lamp lighting device 10.

The discharge lamp lighting device 10 includes, as illustrated in FIG. 7, a power control circuit 20, a polarity inversion circuit 30, a controller 40, an operation detection unit 60, and an igniter circuit 70.

The power control circuit 20 generates driving power which is supplied to the discharge lamp 90. In the present embodiment, the power control circuit 20 is constituted of a down chopper circuit which receives a voltage from the DC power source device 80 and outputs a DC current Id by stepping down the input voltage.

The power control circuit 20 is configured to include a switch element 21, a diode 22, a coil 23, and a capacitor 24. The switch element 21 is constituted of, for example, a transistor. In the present embodiment, one end of the switch element 21 is connected to a positive voltage side of the DC power source device 80, and the other end thereof is connected to a cathode terminal of the diode 22 and one end of the coil 23.

One end of the capacitor 24 is connected to the other end of the coil 23, and the other end of the capacitor 24 is connected to an anode terminal of the diode 22 and a negative voltage side of the DC power source device 80. A current control signal is input to a control terminal of the switch element 21 from the controller 40 which will be described later, and thus turning-on and turning-off of the switch element 21 are controlled. As the current control signal, for example, a pulse width modulation (PWM) control signal may be used.

If the switch element 21 is turned on, a current flows through the coil 23, and thus energy is accumulated in the coil 23. Thereafter, if the switch element 21 is turned off, the energy accumulated in the coil 23 is released along a path passing through the capacitor 24 and the diode 22. As a result, the DC current Id is generated which is proportional to a time period in which the switch element 21 is turned on.

The polarity inversion circuit 30 inverts a polarity of the DC current Id which is input from the power control circuit 20, at a predetermined timing. Consequently, the polarity inversion circuit 30 generates and outputs a driving current I as a DC which is continuously maintained only for a controlled time period, or a driving current I as an AC which has any frequency. In the present embodiment, the polarity inversion circuit 30 is constituted of an inverter bridge circuit (full bridge circuit).

The polarity inversion circuit 30 includes, for example, a first switch element 31, a second switch element 32, a third switch element 33, and a fourth switch element 34, constituted of transistors. The polarity inversion circuit 30 has a configuration in which the first switch element 31 and the second switch element 32 which are connected in series to each other are connected in parallel to the third switch element 33 and the fourth switch element 34 which are connected in series to each other. A polarity inversion control signal is input from the controller 40 to each of control terminals of the first switch element 31, the second switch element 32, the third switch element 33, and the fourth switch element 34. Turning-on and turning-off operations of each of the first switch element 31, the second switch element 32, the third switch element 33, and the fourth switch element 34 are controlled on the basis of the polarity inversion control signal.

In the polarity inversion circuit 30, an operation is repeatedly performed in which the first switch element 31 and the fourth switch element 34, and the second switch element 32 and the third switch element 33 are alternately turned on or off. Therefore, the polarities of the DC current Id output from the power control circuit 20 are alternately inverted. The polarity inversion circuit 30 generates and outputs a driving current I as a DC which is continuously maintained in the same polarity state only for a controlled time period or a driving current I as an AC having a controlled frequency, from a common connection point between the first switch element 31 and the second switch element 32, and a common connection point between the third switch element 33 and the fourth switch element 34.

In other words, in the polarity inversion circuit 30, the second switch element 32 and the third switch element 33 are controlled to be turned off when the first switch element 31 and the fourth switch element 34 are turned on, and the second switch element 32 and the third switch element 33 are controlled to be turned on when the first switch element 31 and the fourth switch element 34 are turned off. Thus, the driving current I is generated which flows in order of the first switch element 31, the discharge lamp 90, and the fourth switch element 34 from one end of the capacitor 24 when the first switch element 31 and the fourth switch element 34 are turned on. The driving current I is generated which flows in order of the third switch element 33, the discharge lamp 90, and the second switch element 32 from one end of the capacitor 24 when the second switch element 32 and the third switch element 33 are turned on.

In the present embodiment, the portion including the power control circuit 20 and the polarity inversion circuit 30 corresponds to a discharge lamp driving unit 230. In other words, the discharge lamp driving unit 230 supplies the driving current I for driving the discharge lamp 90 to the discharge lamp 90.

The controller 40 controls the discharge lamp driving unit 230. More specifically, in the present embodiment, the controller 40 controls the discharge lamp driving unit 230 so that an arc flare angle φ in an arc flare AF which will be described later in the arc discharge AR occurring in the discharge lamp 90 is periodically changed. Details thereof will be described later.

In the example illustrated in FIG. 7, the controller 40 controls the power control circuit 20 and the polarity inversion circuit 30 so as to control parameters such as a duration in which the driving current I is continuously maintained to have the same polarity, and a current value (a power value of the driving power) and a frequency of the driving current I. The controller 40 performs polarity inversion control for controlling the duration in which the driving current I is continuously maintained to have the same polarity, a frequency of the driving current I, and the like, on the polarity inversion circuit 30, on the basis of a polarity inversion timing of the driving current I. The controller 40 performs current control for controlling a current value of the output DC current Id on the power control circuit 20.

A configuration of the controller 40 is not particularly limited. In the present embodiment, the controller 40 is configured to include a system controller 41, a power control circuit controller 42, and a polarity inversion circuit controller 43. Some or all of the controllers of the controller 40 may be configured by using semiconductor integrated circuits.

The system controller 41 controls the power control circuit controller 42 and the polarity inversion circuit controller 43 so as to control the power control circuit 20 and the polarity inversion circuit 30. The system controller 41 may control the power control circuit controller 42 and the polarity inversion circuit controller 43 on the basis of the lamp voltage V1a and the driving current I detected by the operation detection unit 60.

In the present embodiment, the system controller 41 is connected to a storage unit 44.

The system controller 41 may control the power control circuit 20 and the polarity inversion circuit 30 on the basis of information stored in the storage unit 44. The storage unit 44 may store, for example, information regarding driving parameters such as the duration in which the driving current I is continuously maintained to have the same polarity, a current value, a frequency, a waveform, and a modulation pattern of the driving current I.

The power control circuit controller 42 outputs a current control signal to the power control circuit 20 on the basis of a control signal from the system controller 41, so as to control the power control circuit 20.

The polarity inversion circuit controller 43 outputs a polarity inversion control signal to the polarity inversion circuit 30 on the basis of a control signal from the system controller 41, so as to control the polarity inversion circuit 30.

The controller 40 may be implemented by using a dedicated circuit so as to perform the above-described control or various control operations related to processes to be described later. In contrast, the controller 40 functions as a computer, for example, by the CPU executing a control program stored in the storage unit 44, so as to perform various control operations related to such processes.

Figure 8:
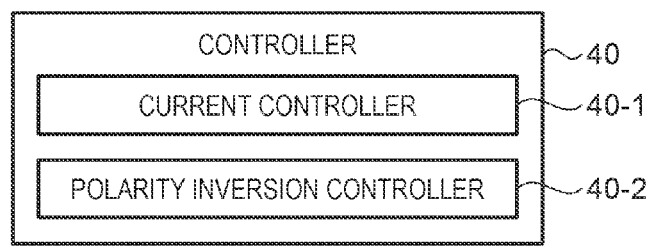
FIG. 8 is a block diagram illustrating a configuration example of a controller according to the present embodiment.

FIG. 8 is a diagram illustrating another configuration example of the controller 40. As illustrated in FIG. 8, the controller 40 may be configured to function as a current controller 40-1 which controls the power control circuit 20 and a polarity inversion controller 40-2 which controls the polarity inversion circuit 30 according to the control program.

In the example illustrated in FIG. 7, the controller 40 is configured as apart of the discharge lamp lighting device 10. In contrast, the CPU 580 may be configured to realize some of the functions of the controller 40.

In the present embodiment, the operation detection unit 60 includes a voltage detection portion which detects the lamp voltage V1a of the discharge lamp 90 and outputs lamp voltage information to the controller 40. The operation detection unit 60 may include a current detection portion or the like which detects the driving current I and outputs driving current information to the controller 40. In the present embodiment, the operation detection unit 60 is configured to include a first resistor 61, a second resistor 62, and a third resistor 63.

In the present embodiment, the voltage detection portion of the operation detection unit 60 detects the lamp voltage V1a on the basis of a voltage divided by the first resistor 61 and the second resistor 62 which are connected in parallel to the discharge lamp 90 and are connected in series to each other. In the present embodiment, the current detection portion detects the driving current I on the basis of a voltage occurring at the third resistor 63 which is connected in series to the discharge lamp 90.

The igniter circuit 70 operates only at the time of starting of lighting of the discharge lamp 90. The igniter circuit 70 supplies a high voltage (a voltage higher than at normal lighting of the discharge lamp 90) which is necessary to cause dielectric breakdown between the electrodes (between the first electrode 92 and the second electrode 93) of the discharge lamp 90 and thus generate a discharge path, between the electrodes of the discharge lamp 90 (between the first electrode 92 and the second electrode 93) at the time of starting of lighting of the discharge lamp 90. In the present embodiment, the igniter circuit 70 is connected in parallel to the discharge lamp 90.

Figure 9:
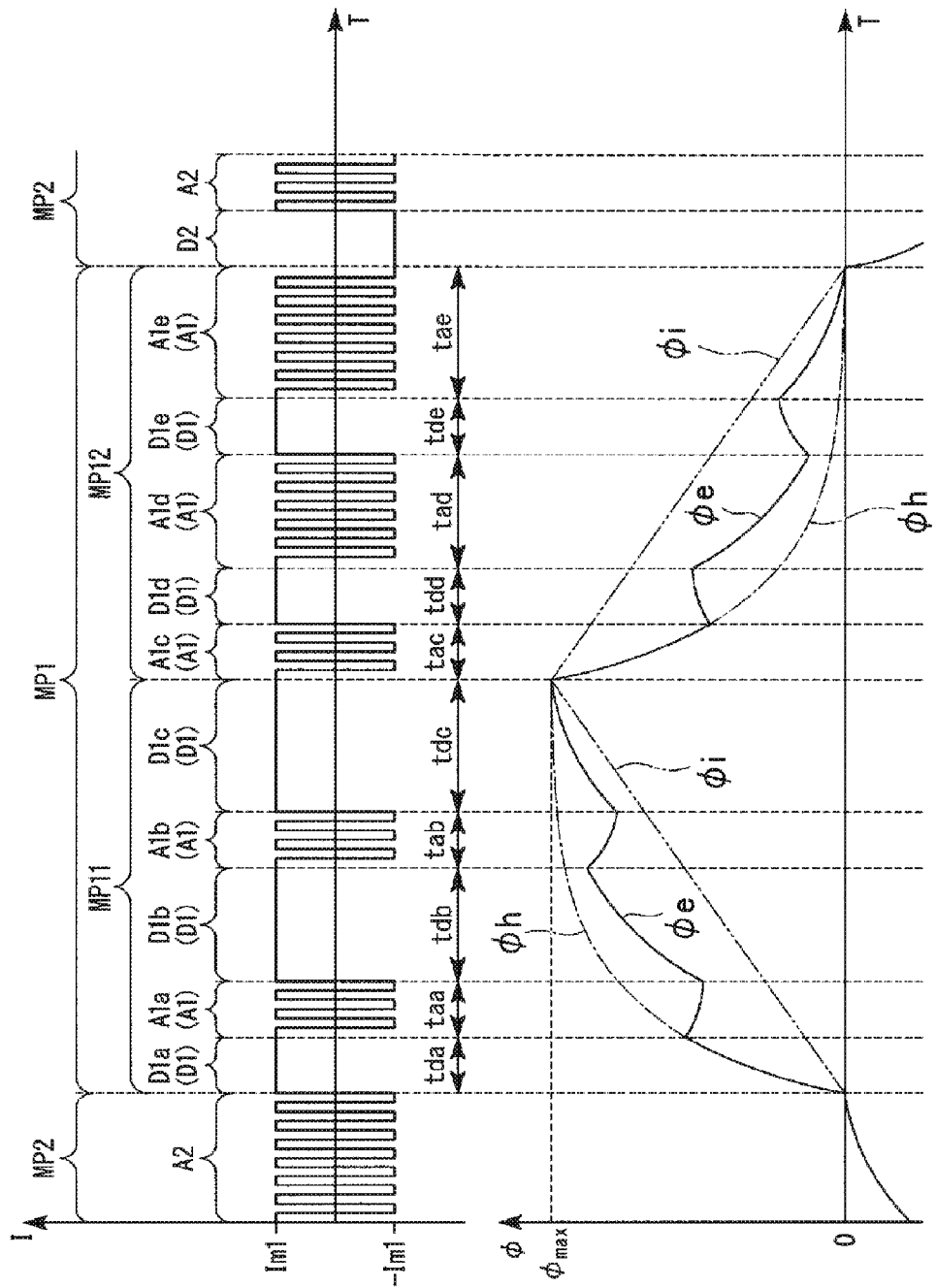
FIG. 9 is a graph illustrating a driving current waveform and an arc flare angle according to the present embodiment.
Figure 10:
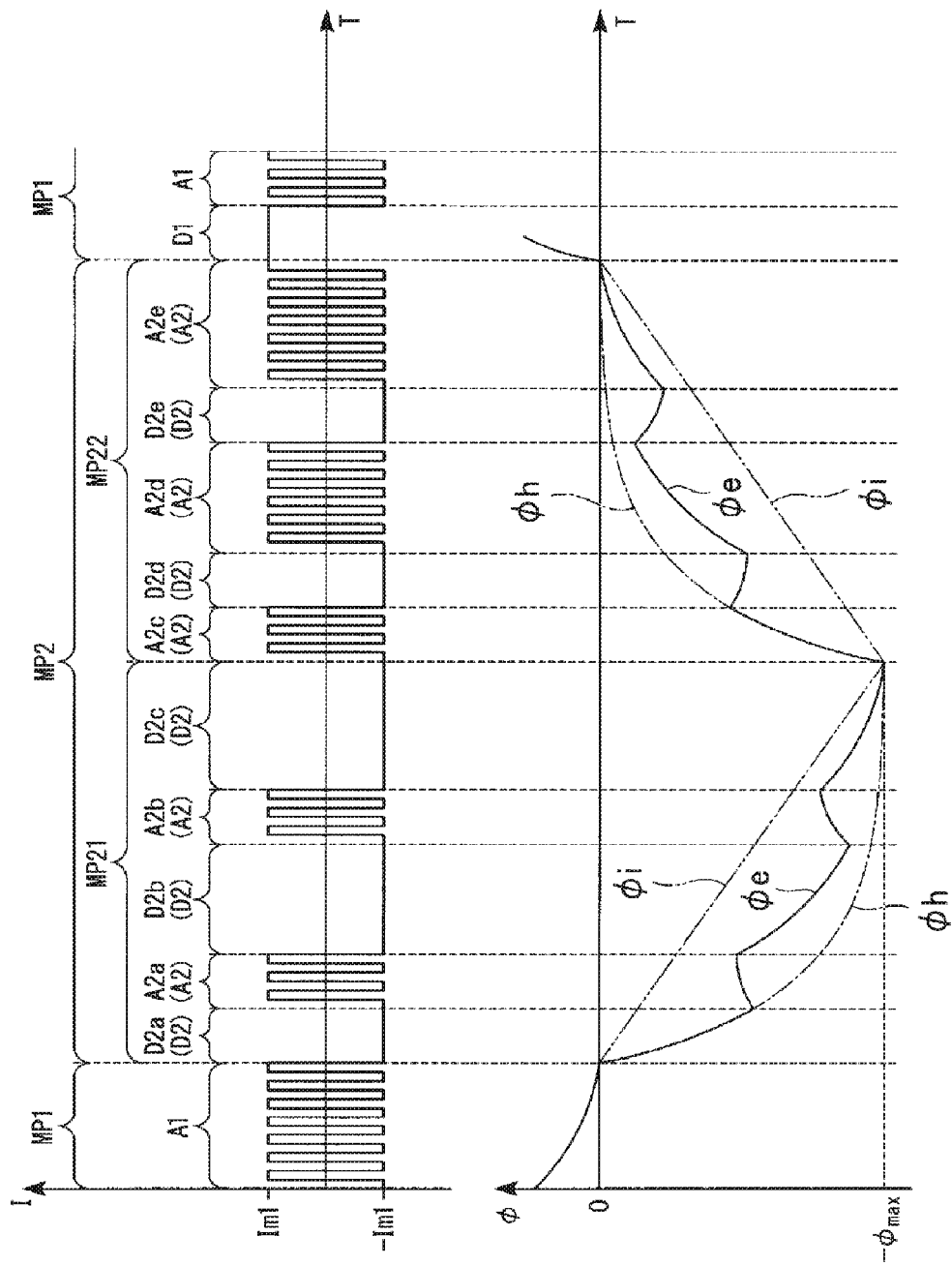
FIG. 10 is a graph illustrating a driving current waveform and an arc flare angle according to the present embodiment.

Hereinafter, a description will be made of control of the discharge lamp driving unit 230 performed by the controller 40. FIGS. 9 and 10 are graphs illustrating a driving current waveform and the arc flare angle φ according to the present embodiment. On an upper part in FIG. 9 and an upper part in FIG. 10, a longitudinal axis expresses the driving current I, and a transverse axis expresses time T. On the upper part in FIG. 9 and the upper part in FIG. 10, the driving current I is illustrated to be positive in a case of the first polarity state, and is illustrated to be negative in a case of the second polarity state. On a lower part in FIG. 9 and a lower part in FIG. 10, a longitudinal axis expresses the arc flare angle φ, and a transverse axis expresses time T.

The controller 40 controls the discharge lamp driving unit 230 so that the driving current I is supplied to the discharge lamp 90 according to the driving current waveforms illustrated in FIGS. 9 and 10. In the present embodiment, the driving current I alternately has a first period MP1 and a second period MP2.

As illustrated in FIG. 9, the first period MP1 is composed of a first hybrid period MP11 and a second hybrid period MP12 provided right after the first hybrid period MP11. The first hybrid period MP11 is a period in which the driving current I is supplied to the discharge lamp 90 so that the arc flare AF which will be described later is inclined toward the second electrode 93 side (+X side). The first hybrid period MP11 alternately includes a first AC period A1 in which an AC current is supplied to the discharge lamp 90, and a first DC period D1 in which a DC current with a first polarity is supplied to the discharge lamp 90.

In the first AC period A1, for example, the square wave driving current I whose polarity is inverted between a current value Im1 and a current value −Im1 multiple times is supplied to the discharge lamp 90. In FIG. 9, as the first AC period A1, two periods such as a first AC period A1a and a first AC period A1b are provided in the first hybrid period MP11. A length taa of the first AC period A1a and a length tab of the first AC period A1b are, for example, the same as each other. A frequency f of the first AC period A1 is, for example, about 100 Hz or more and 5 kHz or less.

In the first DC period D1, a value of the driving current I is maintained to be constant as Im1, for example. In the first hybrid period MP11 in FIG. 9, the first DC period D1 includes three periods such as a first DC period D1a, a first DC period D1b, and a first DC period D1c. A length of each of the three first DC periods D1 increases as the first DC period D1 is provided temporally later in the first hybrid period MP11. In other words, in the present embodiment, the controller 40 changes a length of the first DC period D1 in the first hybrid period MP11 to be temporally increased.

The first DC period D1a, the first DC period D1b, and the first DC period D1c are arranged in this order with the first AC periods A1 interposed between the first DC periods D1. Thus, a length tdb of the first DC period D1b is larger than a length tda of the first DC period D1a. A length tdc of the first DC period D1c is larger than the length tdb of the first DC period D1b.

In the first hybrid period MP11, a length of the first DC period D1 is equal to or larger than a length of the first AC period A1. In the present embodiment, the length tda of the first DC period D1a is the same as, for example, each of the length taa of the first AC period A1a and the length tab of the first AC period A1b. In the first hybrid period MP11, a sum of the lengths of the plurality of first DC periods D1 is, for example, 20 milliseconds (ms) or more.

A ratio R11 of the length of the first DC period D1 to the length of the first AC period A1 temporally increases in the first hybrid period MP11. The ratio R11 of the length of the first DC period D1 to the length of the first AC period A1 is a value obtained by dividing the length of the first DC period D1 by the length of the first AC period A1 which is temporally adjacent to the first DC period D1. Specifically, for example, the ratio R11 increases in order of tda/taa (the length of the first DC period D1a/the length of the first AC period A1a), tdb/taa (the length of the first DC period D1b/the length of the first AC period A1a), and tdc/taa (the length of the first DC period D1c/the length of the first AC period A1a). As mentioned above, the controller 40 changes the ratio R11 of the length of the first DC period D1 to the length of the first AC period A1 in the first hybrid period MP11 to be temporally increased.

In the first hybrid period MP11 in FIG. 9, the respective periods are sequentially provided in order of the first DC period D1a, the first AC period A1a, the first DC period D1b, the first AC period A1b, and the first DC period D1c. A period initially provided and a period finally provided in the first hybrid period MP11 are the first DC periods D1.

The second hybrid period MP12 is a period in which the driving current I is supplied to the discharge lamp 90 so that the arc flare direction AFD of the arc flare AF inclined toward the second electrode 93 side (+X side) which will be described later is returned to the orthogonal direction. The second hybrid period MP12 alternately includes the first AC period A1 and the first DC period D1.

In the second hybrid period MP12 in FIG. 9, the first DC period D1 includes two periods such as a first DC period D1d, and a first DC period D1e. A length tdd of the first DC period D1d and a length tde of the first DC period D1e are, for example, the same as each other.

In the second hybrid period MP12 in FIG. 9, the first AC period A1 includes three periods such as a first AC period A1c, a first AC period A1d, and a first AC period A1e. A length of each of the three first AC periods A1 increases as the first AC period A1 is provided temporally later in the second hybrid period MP12. In other words, in the present embodiment, the controller 40 changes a length of the first AC period A1 in the second hybrid period MP12 to be temporally increased.

The first AC period A1c, the first AC period A1d, and the first AC period A1e are arranged in this order with the first DC period D1 interposed between the first AC periods A1. Thus, a length tad of the first AC period A1d is larger than a length tac of the first AC period A1c. A length tae of the first AC period A1e is larger than the length tad of the first AC period A1d.

In the second hybrid period MP12, a length of the first AC period A1 is equal to or larger than a length of the first DC period D1. In the present embodiment, the length tac of the first AC period A1c is the same as each of the length tdd of the first DC period D1d and the length tde of the first DC period D1e.

A ratio R12 of the length of the first AC period A1 to the length of the first DC period D1 temporally increases in the second hybrid period MP12. The ratio R12 of the length of the first AC period A1 to the length of the first DC period D1 is a value obtained by dividing the length of the first AC period A1 by the length of the first DC period D1 which is temporally adjacent to the first AC period A1. Specifically, for example, the ratio R12 increases in order of tac/tdd (the length of the first AC period A1c/the length of the first DC period D1d), tad/tdd (the length of the first AC period A1d/the length of the first DC period D1d), and tae/tdd (the length of the first AC period A1e/the length of the first DC period D1d). As mentioned above, the controller 40 changes the ratio R12 of the length of the first AC period A1 to the length of the first DC period D1 in the second hybrid period MP12 to be temporally increased.

In the second hybrid period MP12 in FIG. 9, the respective periods are continuously provided in order of the first AC period A1c, the first DC period D1d, the first AC period A1d, the first DC period D1e, and the first AC period A1e. A period initially provided and a period finally provided in the second hybrid period MP12 are the first AC periods A1.

As illustrated in FIG. 10, the second period MP2 is composed of a third hybrid period MP21 and a fourth hybrid period MP22 provided right after the third hybrid period MP21. The third hybrid period MP21 is a period in which the driving current I is supplied to the discharge lamp 90 so that the arc flare AF which will be described later is inclined toward the first electrode 92 side (−X side). The third hybrid period MP21 alternately includes a second AC period A2 in which an AC current is supplied to the discharge lamp 90, and a second DC period D2 in which a DC current with a second polarity opposite to the first polarity is supplied to the discharge lamp 90.

The second AC period A2 is the same as the first AC period A1. The second DC period D2 is the same as the first DC period D1 except that a polarity thereof is inverted. The third hybrid period MP21 in FIG. 10 is composed of a second DC period D2a, a second AC period A2a, a second DC period D2b, a second AC period A2b, and a second DC period D2c sequentially provided in this order. A driving current waveform in the third hybrid period MP21 is the same as the driving current waveform in the first hybrid period MP11 except that the polarity is inverted. The controller 40 changes a ratio R21 of the length of the second DC period D2 to the length of the second AC period A2 in the third hybrid period MP21 to be temporally increased.

The fourth hybrid period MP22 is a period in which the driving current I is supplied to the discharge lamp 90 so that the arc flare direction AFD of the arc flare AF inclined toward the first electrode 92 side (−X side) is returned to the orthogonal direction. The fourth hybrid period MP22 alternately includes the second AC period A2 and the second DC period D2.

The fourth hybrid period MP22 in FIG. 10 is composed of a second AC period A2c, a second DC period D2d, a second AC period A2d, a second DC period D2e, and a second AC period A2e sequentially provided in this order. A driving current waveform in the fourth hybrid period MP22 is the same as the driving current waveform in the second hybrid period MP12 except that the polarity is inverted. The controller 40 changes a ratio R22 of the length of the second AC period A2 to the length of the second DC period D2 in the fourth hybrid period MP22 to be temporally increased.

The above-described operation in which discharge lamp lighting device 10 supplies the driving current I to the discharge lamp 90 may be expressed as a discharge lamp driving method. In other words, according to an aspect of the present embodiment, there is provided a discharge lamp driving method including supplying the driving current I to the discharge lamp 90 including the first electrode 92 and the second electrode 93 so as to drive the discharge lamp 90, in which the driving current I having the first hybrid period MP11 and the second hybrid period MP12 alternately including the first AC period A1 in which an AC current is supplied to the discharge lamp 90 and the first DC period D1 in which a DC current with a first polarity is supplied to the discharge lamp 90 is supplied to the discharge lamp 90, the ratio R11 of the length of the first DC period D1 to the length of the first AC period A1 is changed to be temporally increased in the first hybrid period MP11, and the ratio R12 of the length of the first AC period A1 to the length of the first DC period D1 is changed to be temporally increased in the second hybrid period MP12.

The arc flare angle φ can be periodically changed by supplying the driving current I to the discharge lamp 90 according to the above-described driving current waveforms. Hereinafter, details thereof will be described.

First, the arc flare angle φ will be described.

Figure 11:
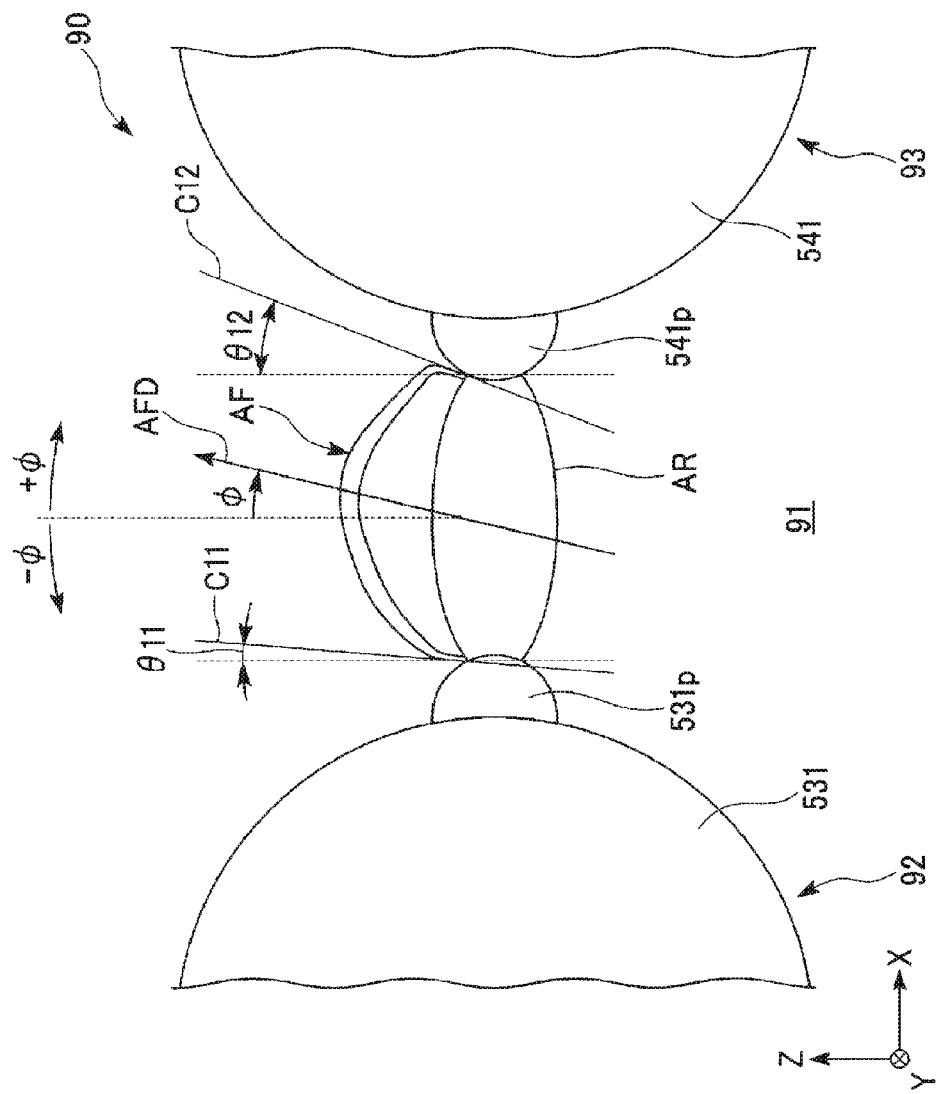
FIG. 11 is a diagram for explaining an arc flare angle.
Figure 12:
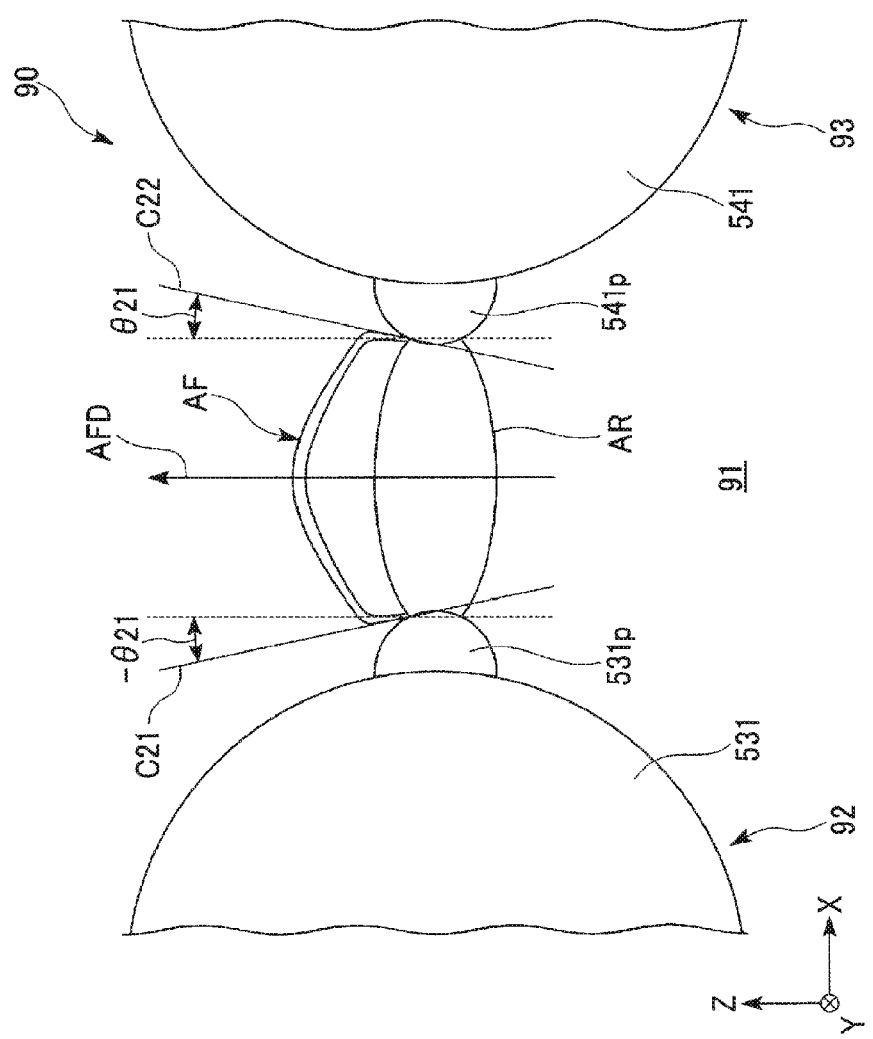
FIG. 12 is a diagram for explaining an arc flare angle.

FIGS. 11 and 12 are diagrams for explaining the arc flare angle φ. FIG. 11 illustrates an enlarged position where the arc discharge AR occurs in FIG. 3. FIG. 12 illustrates an enlarged position where the arc discharge AR occurs in FIG. 4.

As illustrated in FIGS. 11 and 12, the arc flare AF is generated on the vertical direction upper side (+Z side) of the arc discharge AR. The arc flare AF is a portion in which a gas such as mercury enclosed in the discharge space 91 passes through the arc discharge AR or the vicinity of the arc discharge AR, and emits light. The gas such as mercury expands when passing through the arc discharge AR or the vicinity of the arc discharge AR. Thus, the arc flare AF spreads, for example, in the facing direction (X axis direction).

As illustrated in FIG. 11, the arc flare angle φ is an angle at which the arc flare direction AFD which is an inclined direction of the arc flare AF is inclined with respect to the orthogonal direction (Z axis direction), that is, the vertical direction in the present embodiment.

As illustrated in FIGS. 3 and 11, the arc flare direction AFD is a direction of the center of the convections AC which pass through the arc flare AF and flow toward the upper side (+Z side) of the arc flare AF. More specifically, the arc flare direction AFD has an average angle of an angle φ11 of a first approximate straight line C11 illustrated in FIG. 11 with respect to the orthogonal direction (Z axis direction) and an angle φ12 of a second approximate straight line C12 with respect to the orthogonal direction. In other words, the arc flare direction AFD is a direction of a straight line which equally divides an angle formed between the first approximate straight line C11 and the second approximate straight line C12 into two.

The first approximate straight line C11 is an approximate straight line at a location in contact with the protrusion 531p of the first electrode 92 and the vicinity thereof in a contour line of the arc flare AF. The second approximate straight line C12 is an approximate straight line at a location in contact with the protrusion 541p of the second electrode 93 and the vicinity thereof in the contour line of the arc flare AF.

The vicinity of the location in contact with the protrusion 531p of the first electrode 92 in the contour line of the arc flare AF includes, for example, a location whose distance is within about 0.1 mm from the location in contact with the protrusion 531p of the first electrode 92 in the contour line of the arc flare AF. This is also the same for the vicinity of the location in contact with the protrusion 541p of the second electrode 93 in the contour line of the arc flare AF.

As illustrated in FIG. 12, in a case where the arc flare direction AFD is the orthogonal direction (Z axis direction), that is, a direction which is parallel to the vertical direction in the present embodiment, the arc flare angle φ is 0°. In this case, an angle of a first approximate straight line C21 illustrated in FIG. 12 with respect to the orthogonal direction is −θ21, and an angle of a second approximate straight line C22 with respect to the orthogonal direction is θ21. In other words, the first approximate straight line C21 and the second approximate straight line C22 are inclined toward an opposite side with the orthogonal direction as a reference. The first approximate straight line C21 is the same as the first approximate straight line C11 in FIG. 11 except that inclinations thereof are different from each other. The second approximate straight line C22 is the same as the second approximate straight line C12 in FIG. 11 except that inclinations thereof are different from each other.

A specific method of measuring the arc flare angle φ may employ, for example, a measurement method using an image. For example, a captured image of the arc flare AF is converted into a grayscale image, and a portion in which a numerical value of brightness information is within a predetermined range is extracted therefrom. Consequently, a contour of the arc flare AF emitting light is detected. The arc flare angle φ is calculated by using the first approximate straight line C11 and the second approximate straight line C12 which are obtained on the basis of the detected contour of the arc flare AF. In a case of using this measurement method, for example, a plurality of images are captured within a predetermined period of time, and an average value of values of the arc flare angles φ calculated from the plurality of respective images may be used as the arc flare angle φ.

Next, a description will be made of a structure in which the arc flare angle φ is changed.

In the present embodiment, the arc flare angle φ has a positive value, for example, in a case where the arc flare direction AFD is inclined toward the second electrode 93 side (+X side) with respect to the orthogonal direction (Z axis direction), and has a negative value in a case where the arc flare direction AFD is inclined toward the first electrode 92 side (−X side) with respect to the orthogonal direction. In this case, in the first period MP1 illustrated in FIG. 9, the arc flare angle φ is positive as illustrated in FIGS. 3 and 11, and, in the second period MP2 illustrated in FIG. 10, the arc flare angle φ is negative as illustrated in FIG. 5. This phenomenon occurs for the following reason.

For example, the first DC period D1 is provided in the first period MP1, and thus the temperature of the first electrode 92 serving as an anode increases. On the other hand, in the first period MP1, the temperature of the second electrode 93 serving as a cathode decreases. Consequently, a difference between the temperatures of the first electrode 92 and the second electrode 93 increases, and thus rising air currents occurring from the upper side (+Z side) of the first electrode 92 become stronger than rising air currents occurring from the upper side of the second electrode 93. Therefore, the arc flare AF is pushed toward the second electrode 93 side (+X side) as a cathode by the rising air currents occurring from the upper side of the first electrode 92, and thus the arc flare direction AFD of the arc flare AF is inclined toward the second electrode 93 side. As a result, the arc flare angle φ has a positive value.

In the same manner as in the first period MP1, in the second period MP2, the temperature of the second electrode 93 serving as an anode is higher than the temperature of the first electrode 92 serving as a cathode. Thus, the arc flare direction AFD is inclined toward the first electrode 92 side (−X side) due to rising air currents occurring on the upper side (+Z side) of the second electrode 93 as illustrated in FIG. 5, and thus the arc flare angle φ has a negative value.

An absolute value of the arc flare angle φ increases as a difference between the temperatures of the first electrode 92 and the second electrode 93 becomes larger, and decreases as a difference between the temperatures of the first electrode 92 and the second electrode 93 becomes smaller. In a case where the temperature of the first electrode 92 is substantially the same as the temperature of the second electrode 93, the arc flare angle φ is approximately 0° as illustrated in FIGS. 4 and 12.

Here, the temperature of the first electrode 92 being substantially the same as the temperature of the second electrode 93 includes, for example, a case where a difference between the temperature of the first electrode 92 and the temperature of the second electrode 93 is less than 100° C. In this case, there is no great difference between rising air currents occurring on the upper side of the first electrode 92 and rising air currents occurring on the upper side of the second electrode 93, and the arc flare angle φ is hardly changed.

As an example, in a case where the arc flare angle φ is about 10° or more and 15° or less, a difference between the temperatures of the first electrode 92 and the second electrode 93 may be 200° C. or more and 400° C. or less.

Next, a description will be made of a periodic change in the arc flare angle φ in the present embodiment.

As illustrated in FIG. 9, in the first hybrid period MP11 of the first period MP1, the length of the first DC period D1 temporally increases, and thus the temperature of the first electrode 92 increases. Consequently, the arc flare direction AFD is changed from a direction (the arc flare angle φ=0°) which is parallel to the orthogonal direction (Z axis direction) illustrated in FIG. 4 to the direction (the arc flare angle φ>0°) inclined toward the second electrode 93 side (+X side) illustrated in FIG. 3.

As illustrated in FIG. 9, in the second hybrid period MP12 of the first period MP1, the length of the first AC period A1 temporally increases, and thus the temperature of the first electrode 92 increased in the first hybrid period MP11 decreases. Consequently, the arc flare direction AFD is changed from the direction (the arc flare angle φ>0°) inclined toward the second electrode 93 side (+X side) illustrated in FIG. 3 to the direction (the arc flare angle φ=0°) which is parallel to the orthogonal direction (Z axis direction) illustrated in FIG. 4.

As illustrated in FIG. 10, in the third hybrid period MP21 of the second period MP2, the length of the second DC period D2 temporally increases, and thus the temperature of the second electrode 93 increases. Consequently, the arc flare direction AFD is changed from the direction (the arc flare angle φ=0°) which is parallel to the orthogonal direction (Z axis direction) illustrated in FIG. 4 to the direction (the arc flare angle φ<0°) inclined toward the first electrode 92 side (−X side) illustrated in FIG. 5.

As illustrated in FIG. 10, in the fourth hybrid period MP22 of the second period MP2, the length of the second AC period A2 increases, and thus the temperature of the second electrode 93 increased in the third hybrid period MP21 decreases. Consequently, the arc flare direction AFD is changed from the direction (the arc flare angle φ<0°) inclined toward the first electrode 92 side (−X side) illustrated in FIG. 5 to the direction (the arc flare angle φ=0°) which is parallel to the orthogonal direction (Z axis direction) illustrated in FIG. 4.

Therefore, since the first period MP1 and the second period MP2 are alternately repeated, the arc flare direction AFD, that is, the arc flare angle φ is periodically changed among the respective states illustrated in FIGS. 3 to 5. The respective states illustrated in FIGS. 3 to 5 continuously change according to a change in a difference between the temperature of the first electrode 92 and the temperature of the second electrode 93.

In the present embodiment, an absolute value of the arc flare angle φ is, for example, 20° or less. In other words, the arc flare angle φ is periodically changed within a range, for example, from −20° to 20°. If the arc flare angle φ is periodically changed within this range, it is possible to further prevent devitrification.

In the above-described way, it is possible to change the arc flare angle φ periodically.

According to the present embodiment, the arc flare angle φ is changed, and thus it is possible to prevent the occurrence of devitrification. Hereinafter, details thereof will be described.

For example, in a case where an AC current with a plurality of frequencies is supplied to the discharge lamp 90, a difference between the temperature of the first electrode 92 and the temperature of the second electrode 93 relatively hardly increases. Thus, the temperature of the first electrode 92 and the temperature of the second electrode 93 are substantially the same as each other, and the arc flare direction AFD is likely to a direction which is approximately parallel to the orthogonal direction (Z axis direction) as illustrated in FIGS. 4 and 12. In other words, the arc flare angle φ is likely to be substantially 0°.

Here, the arc flare direction AFD is a direction in which the convection AC having passed through the arc flare AF, that is, a gas such as mercury reaches the inner wall of the light emitting tube 510 fastest. Thus, a portion of the inner wall of the light emitting tube 510 located on the extension line of the arc flare direction AFD collides with the convection AC in a state in which the temperature of the convection AC is highest. Consequently, the portion of the inner wall of the light emitting tube 510 located on the extension line of the arc flare direction AFD is the most heated location in the inner wall of the light emitting tube 510.

Thus, for example, in the state illustrated in FIG. 4, the most heated portion HTA2 located on the extension line of the arc flare direction AFD is the most heated location in the inner wall of the light emitting tube 510. If this state lasts for a long period of time, the temperature of the most heated portion HTA2 excessively increases, and thus there is a problem in that devitrification occurs. The most heated portion HTA2 is a part of the inner wall of a light emitting tube upper portion 510a which is an upper side (+Z side) portion of the light emitting tube 510.

In relation to the problem, according to the present embodiment, the first hybrid period MP11 and the second hybrid period MP12 are provided, and, thus, as described above, the arc flare angle φ (arc flare direction AFD) can be changed. Consequently, it is possible to change a location which is most heated by the convections AC in the light emitting tube 510. Therefore, it is possible to prevent a part of the inner wall of the light emitting tube 510 from being excessively heated. As a result, according to the present embodiment, it is possible to prevent the occurrence of devitrification.

For example, in a case where a DC current with the first polarity is continuously supplied to the discharge lamp 90 in a period corresponding to the first hybrid period MP11, and an AC current is continuously supplied to the discharge lamp 90 in a period corresponding to the second hybrid period MP12, the arc flare angle $\varphi$ is changed as in a curve $\varphi h$ indicated by a dot chain line in FIG. 9. In this case, the arc flare angle $\varphi$ can be changed, but the angular velocity of the arc flare angle $\varphi$ greatly varies, and there is a case where time required to be most heated by the convections AC varies depending on each position on the inner wall of the light emitting tube 510 while the arc flare angle $\varphi$ is changed.

Specifically, in the curve $\varphi h$ for the period corresponding to the first hybrid period MP11, the arc flare angle $\varphi$ initially rapidly increases, and then reaches $\varphi max$ while the increase rate (angular velocity) of the arc flare angle $\varphi$ is gradually reduced. Thus, in a range in which the arc flare angle $\varphi$ is relatively small, the angular velocity of the arc flare angle $\varphi$ is relatively high, and the time required for the inner wall of the light emitting tube 510 to be most heated is relatively short. On the other hand, in a range in which the arc flare angle $\varphi$ is relatively large, the angular velocity of the arc flare angle $\varphi$ is relatively low, and the time required for the inner wall of the light emitting tube 510 to be most heated is relatively long. The angular velocity of the arc flare angle $\varphi$ is an inclination of the graph on each of the lower part in FIG. 9 and the lower part in FIG. 10.

In the curve $\varphi h$ for the period corresponding to the second hybrid period MP12, the arc flare angle $\varphi$ initially rapidly decreases, and then reaches 0° while the decrease rate of the arc flare angle $\varphi$ is gradually reduced. Thus, in a range in which the arc flare angle $\varphi$ is relatively large, the angular velocity of the arc flare angle $\varphi$ is relatively high, and the time required for the inner wall of the light emitting tube 510 to be most heated is relatively short. On the other hand, in a range in which the arc flare angle $\varphi$ is relatively small, the angular velocity of the arc flare angle $\varphi$ is relatively low, and the time required for the inner wall of the light emitting tube 510 to be most heated is relatively long.

As mentioned above, if the angular velocity of the arc flare angle $\varphi$ varies, there is a case where there is the generation of a location where the time required to be most heated is relatively long in the inner wall of the light emitting tube 510 while the arc flare angle $\varphi$ is changed. Consequently, there is a case where denitrification tends to occur.

In relation to the above-described problem, ideally, it is preferable to change the arc flare angle $\varphi$ linearly with respect to the time T as in an ideal straight line $\varphi i$ indicated by a two-dot chain line in FIG. 9. If the arc flare angle $\varphi$ is changed in the above-described way, the angular velocity can be made constant when the arc flare angle $\varphi$ is changed in each of the first hybrid period MP11 and the second hybrid period MP12. Thus, the time required for the inner wall of the light emitting tube 510 to be most heated can be made uniform while the arc flare angle $\varphi$ is changed.

In contrast, according to the present embodiment, the arc flare angle $\varphi$ may be changed as in a change curve $\varphi e$ indicated by a solid line in FIG. 9 in the first hybrid period MP11 and the second hybrid period MP12 of the first period MP1.

Here, since the temperature of the first electrode 92 can be increased in the first DC period D1, the arc flare angle $\varphi$ can be increased by increasing a difference between the temperature of the first electrode 92 and the temperature of the second electrode 93. Since both of the first electrode 92 and the second electrode 93 are alternately heated in the first AC period A1, a difference between the temperature of the first electrode 92 and the temperature of the second electrode 93 is reduced. Thus, the arc flare angle $\varphi$ can be reduced. In the range in which the arc flare angle $\varphi$ is relatively small, an increase rate (that is, angular velocity) of the arc flare angle $\varphi$ per time in the first DC period D1 is relatively high, and a decrease rate (that is, angular velocity) of the arc flare angle $\varphi$ per time in the first AC period A1 is relatively low. On the other hand, in the range in which the arc flare angle $\varphi$ is relatively large, an increase rate of the arc flare angle $\varphi$ per time in the first DC period D1 is relatively low, and a decrease rate of the arc flare angle $\varphi$ per time in the first AC period A1 is relatively high.

Consequently, in the change curve $\varphi e$, the arc flare angle $\varphi$ rapidly increases in the first DC period D1a, and then the arc flare angle $\varphi$ is reduced in the first AC period A1a. The arc flare angle $\varphi$ increases again in the first DC period D1b, and then the arc flare angle $\varphi$ is reduced again in the first AC period A1b. The arc flare angle $\varphi$ further increases again in the first DC period D1c, and thus the arc flare angle $\varphi$ reaches $\varphi max$. As mentioned above, in the first hybrid period MP11, the first DC period D1 and the first AC period A1 are alternately repeated, and thus the arc flare angle $\varphi$ can be increased as a whole while alternately repeating an increase and a reduction of the arc flare angle $\varphi$. This is because, since the ratio R11 of the length of the first DC period D1 to the length of the first AC period A1 temporally increases in the first hybrid period MP11, an increase rate of the arc flare angle $\varphi$ in the first DC period D1 can be made higher than a decrease rate of the arc flare angle $\varphi$ in the first AC period A1. Consequently, in the first hybrid period MP11, the change curve $\varphi e$ of the arc flare angle $\varphi$ can be made closer to the ideal curve $\varphi i$ than the curve $\varphi h$.

In the change curve $\varphi e$, the arc flare angle $\varphi$ is rapidly reduced in the first AC period A1c, and then the arc flare angle $\varphi$ increases in the first DC period D1d. The arc flare angle $\varphi$ is reduced again in the first AC period A1d, and then the arc flare angle $\varphi$ increases again in the first DC period D1e. The arc flare angle $\varphi$ is further reduced again in the first AC period A1e, and the arc flare angle $\varphi$ reaches 0°. As mentioned above, in the second hybrid period MP12, the first AC period A1 and the first DC period D1 are alternately repeated, and thus the arc flare angle $\varphi$ can be reduced as a whole while alternately repeating a reduction and an increase of the arc flare angle $\varphi$. This is because, since the ratio R12 of the length of the first AC period A1 to the length of the first DC period D1 temporally increases in the second hybrid period MP12, a decrease rate of the arc flare angle $\varphi$ in the first AC period A1 can be made higher than an increase rate of the arc flare angle $\varphi$ in the first DC period D1. Consequently, in the second hybrid period MP12, the change curve $\varphi e$ of the arc flare angle $\varphi$ can be made closer to the ideal curve $\varphi i$ than the curve $\varphi h$.

As mentioned above, according to the present embodiment, it is possible to prevent a variation in the angular velocity of the arc flare angle $\varphi$ until the arc flare angle $\varphi$ is inclined toward one side and is then returned in the first hybrid period MP11 and the second hybrid period MP12. Therefore, it is possible to prevent a variation in the time required for the inner wall of the light emitting tube 510 to be most heated and thus to further prevent the occurrence of denitrification.

As illustrated in FIG. 10, also in the second period MP2, in the same manner as in the first period MP1, the change curve $\varphi e$ of the arc flare angle $\varphi$ can be made closer to the ideal curve $\varphi i$ than the curve $\varphi h$. A change of the change curve φe in the second period MP2 is the same as the change of the change curve φe in the first period MP1 except that polarities thereof are inverted. The arc flare angle φ in the second period MP2 reaches −φmax.

For example, in a case where a ratio of the first DC period to the first AC period is not temporally increased in the first hybrid period, if the arc flare angle φ increases to some extent in the middle of the first hybrid period, there is a case where an increase rate of the arc flare angle φ in the first DC period is the same as a decrease rate of the arc flare angle φ in the first AC period, and thus the arc flare angle φ does not reach φmax (or −φmax).

According to the present embodiment, the controller 40 increases the ratio R11 of the length of the first DC period D1 to the length of the first AC period A1 by temporally increasing the length of the first DC period D1 in the first hybrid period MP11. Since the temperature of the first electrode 92 is increased in the first DC period D1, it is possible to easily increase the temperature of the first electrode 92 and thus to easily increase the arc flare angle φ by temporally increasing the length of the first DC period D1. Consequently, it is possible to reduce the time required for the arc flare angle φ to reach φmax from 0° in the first hybrid period MP11. Therefore, it is possible to increase an average value of angular velocities of the arc flare angle φ in the first hybrid period MP11 and thus to reduce the time required for each portion of the inner wall of the light emitting tube 510 to be most heated. As a result, it is possible to further prevent the occurrence of devitrification.

According to the present embodiment, the controller 40 increases the ratio R12 of the length of the first AC period A1 to the length of the first DC period D1 by temporally increasing the length of the first AC period A1 in the second hybrid period MP12. Since a difference between the temperature of the first electrode 92 and the temperature of the second electrode 93 is reduced in the first AC period A1, it becomes easier to reduce the arc flare angle φ by temporally increasing the length of the first AC period A1. Consequently, it is possible to reduce the time required for the arc flare angle φ to reach 0° from φmax in the second hybrid period MP12. Therefore, it is possible to increase an average value of angular velocities of the arc flare angle φ in the second hybrid period MP12 and thus to reduce the time required for each portion of the inner wall of the light emitting tube 510 to be most heated. As a result, it is possible to further prevent the occurrence of devitrification.

According to the present embodiment, in the first hybrid period MP11, the length of the first DC period D1 is equal to or larger than the length of the first AC period A1. Thus, it is possible to easily increase the arc flare angle φ in the first hybrid period MP11.

According to the present embodiment, in the second hybrid period MP12, the length of the first AC period A1 is equal to or larger than the length of the first DC period D1. Thus, it is possible to easily reduce the arc flare angle φ in the second hybrid period MP12.

According to the present embodiment, since the second hybrid period MP12 is provided sequentially right after the first hybrid period MP11, the arc flare angle φ can be reduced in the second hybrid period MP12 right after the arc flare angle φ is increased in the first hybrid period MP11. Consequently, it is possible to reduce heating time due to the convections AC at a location of the inner wall of the light emitting tube 510 which is most heated when the arc flare angle φ becomes φmax. Therefore, it is possible to further prevent the occurrence of denitrification.

According to the present embodiment, the first hybrid period MP11 starts at the first DC period D1a and ends at the first DC period D1c. Thus, in the first hybrid period MP11, the arc flare angle φ can be increased from right after the first hybrid period MP11 starts, and the arc flare angle φ can be caused to reach φmax at a time point at which the first hybrid period MP11 ends. The second hybrid period MP12 starts at the first AC period A1c and ends at the first AC period A1e. Thus, in the second hybrid period MP12, the arc flare angle φ can be reduced from right after the second hybrid period MP12 starts, and the arc flare angle φ can be caused to reach 0° at a time point at which the second hybrid period MP12 ends. Consequently, according to the present embodiment, it is possible to appropriately change the arc flare angle φ.

According to the present embodiment, the third hybrid period MP21 and the fourth hybrid period MP22 are provided. Thus, even in a case where the arc flare AF is inclined toward the first electrode 92 side (−X side), that is, the side on which the arc flare angle φ is negative, it is possible to prevent a variation in the angular velocity of the arc flare angle φ and thus to prevent a variation in the time required for the inner wall of the light emitting tube 510 to be most heated. Consequently, it is possible to further prevent the occurrence of denitrification.

According to the present embodiment, since the first period MP1 and the second period MP2 are alternately provided, the arc flare AF is alternately inclined toward the positive side and the negative side, and thus the arc flare direction AFD is periodically changed as illustrated in FIGS. 3 to 5. In other words, the arc flare angle φ is periodically changed between −φmax and φmax.

For example, the most heated location in the light emitting tube 510 is the most heated portion HTA1 in a case where the arc flare direction AFD is in the state illustrated in FIG. 3. For example, the most heated location in the inner wall of the light emitting tube 510 is the most heated portion HTA3 in a case where the arc flare direction AFD is in the state illustrated in FIG. 5. The most heated portion HTA1 and the most heated portion HTA3 are parts of the inner wall of the light emitting tube upper portion 510a.

Therefore, according to the present embodiment, a location which is most heated in the arc flare direction AFD changes between the most heated portion HTA1 and the most heated portion HTA3 through the most heated portion HTA2. Consequently, since heat caused by the convections AC can be received in a distribution manner in a wide range of the inner wall of the light emitting tube upper portion 510a, it is possible to prevent the temperature of a part of the inner wall of the light emitting tube 510 from being excessively increased. As a result, according to the present embodiment, it is possible to prevent the occurrence of devitrification.

For example, in a case where an absolute value of the arc flare angle φ is changed in a range of being smaller than 5°, a range in which the most heated location in the inner wall of the light emitting tube 510 may be narrow, and it may be hard to sufficiently achieve an effect of preventing devitrification.

In contrast, according to the present embodiment, in the first hybrid period MP11, a sum of the lengths of the first DC periods D1 is 20 milliseconds (ms) or more. Consequently, for example, it is possible to easily set the maximum value (φmax) of an absolute value of the arc flare angle φ to be 5° or more, and to appropriately achieve an effect of preventing devitrification.

As described above, the arc flare angle φ is increased as a difference between the temperature of the first electrode 92 and the temperature of the second electrode 93 is increased. If the arc flare angle φ is increased, an angle range in which the arc flare direction AFD is changed can be increased, and thus it is possible to increase a range in which the most heated location in the inner wall of the light emitting tube 510 is changed. However, on the other hand, if a difference between the temperature of the first electrode 92 and the temperature of the second electrode 93 excessively increases, there is concern that the protrusion of the electrode whose temperature is higher may be excessively melted, and thus the arc discharge AR may be unstably generated.

In contrast, according to the present embodiment, an absolute value of the arc flare angle φ is changed within a range of 20° or less. If the arc flare angle φ is changed within this range, it is possible to prevent a difference between the temperature of the first electrode 92 and the temperature of the second electrode 93 from being excessively increased. Consequently, it is possible to cause the arc discharge AR to be stably generated, and also to more appropriately prevent the occurrence of devitrification. If a sum of the lengths of the first DC periods D1 is, for example, about 50 milliseconds (ms) or less in the first hybrid period MP11, an absolute value of the arc flare angle φ can be easily set to be 20° or less.

The above-described arc flare angle φ is a new finding obtained by the present inventors. Changing the arc flare angle φ by changing a difference between the temperature of the first electrode 92 and the temperature of the second electrode 93 is a new finding obtained by the present inventors. Preventing the occurrence of denitrification by changing the arc flare angle φ is a new finding obtained by the present inventors.

In the present embodiment, the following configurations and methods may be employed.

In the present embodiment, the controller 40 may change and temporally reduce the length of the first AC period A1 instead of changing the first DC period D1 in the first hybrid period MP11. In the first hybrid period MP11, the controller 40 may change and temporally increase the length of the first DC period D1, and may change and temporally reduce the length of the first AC period A1. Also in this case, it is possible to change and temporally increase the ratio R11 of the length of the first DC period D1 to the length of the first AC period A1 in the first hybrid period MP11.

In the present embodiment, the controller 40 may change and temporally reduce the length of the first DC period D1 instead of changing the first AC period A1 in the second hybrid period MP12. In the second hybrid period MP12, the controller 40 may change and temporally increase the length of the first AC period A1, and may change and temporally reduce the length of the first DC period D1. Also in this case, it is possible to change and temporally increase the ratio R12 of the length of the first AC period A1 to the length of the first DC period D1 in the second hybrid period MP12.

In the present embodiment, a length of at least one of the first DC periods D1 included in the first hybrid period MP11 may be smaller than a length of each of the first AC periods A1 included in the first hybrid period MP11. In the present embodiment, a length of at least one of the first AC periods A1 included in the second hybrid period MP12 may be smaller than a length of each of the first DC periods D1 included in the second hybrid period MP12.

In the present embodiment, lengths of a plurality of first AC periods A1 included in the first hybrid period MP11 may be different from each other.

In the present embodiment, lengths of a plurality of first DC periods D1 included in the second hybrid period MP12 may be different from each other.

In the present embodiment, another period may be provided between the first hybrid period MP11 and the second hybrid period MP12. Another period may be provided between the third hybrid period MP21 and the fourth hybrid period MP22. Another period is, for example, a period in which a DC current is supplied to the discharge lamp 90.

In the present embodiment, either one of the first period MP1 and the second period MP2 may be provided. In the present embodiment, the orthogonal direction (Z axis direction) is a vertical direction, but is not limited thereto.

In the above-described embodiment, a description has been made of an example of a case where the invention is applied to the transmissive projector, but the invention is applicable to a reflective projector. Here, the term "transmissive" indicates a type in which a liquid crystal light valve including a liquid crystal panel or the like transmits light therethrough. The term "reflective" indicates a type in which the liquid crystal light valve reflects light. A light modulation device is not limited to a liquid crystal panel or the like, and may be a light modulation device using, for example, a micro-mirror.

In the respective embodiments, a description has been made of an example of the projector 500 using the three liquid crystal panels 560R, 560G and 560B (the liquid crystal light valves 330R, 330G and 330B), but the invention is applicable to a projector using only a single liquid crystal panel, and to a projector using four or more liquid crystal panels.

The above-described configurations may be combined with each other as appropriate so as not to cause contradiction therebetween.

EXAMPLE

The effect of the invention was verified by comparing Example of the present embodiment with Comparative Examples 1 and 2. In both of Example and Comparative Examples 1 and 2, a high pressure mercury lamp having rating power of 200 W was used as a discharge lamp. In Example, the driving current I having the driving current waveforms illustrated in FIGS. 9 and 10 was supplied to the discharge lamp. A length of each period in the first hybrid period MP11 was set as shown in Table 1, and a length of each period in the second hybrid period MP12 was set as shown in Table 2.

TABLE 1

| First hybrid period MP11 | Length [ms] | Ratio R11 of length of first DC period to length of first AC period |
|---|---|---|
| First DC period D1a | 4 | 1 |
| First AC period A1a | 4 | — |
| First DC period D1b | 8 | 2 |
| First AC period A1b | 4 | — |
| First DC period D1c | 10 | 2.5 |

TABLE 2

| Second hybrid period MP12 | Length [ms] | Ratio R12 of length of first AC period to length of first DC period |
|---|---|---|
| First AC period A1c | 4 | 1 |
| First DC period D1d | 4 | — |
| First AC period A1d | 8 | 2 |
| First DC period D1e | 4 | — |
| First AC period A1e | 10 | 2.5 |

Table 1 also shows the ratio R11 of the length of the first DC period D1 to the length of the first AC period A1. Table 2 also shows the ratio R12 of the length of the first AC period A1 to the length of the first DC period D1. A frequency f of the first AC period A1 was 520 Hz. The length of each period is set as in Tables 1 and 2, and, thus, in Example, the arc flare angle φ is changed within a range of, for example, −15° or more and 15° or less.

In the third hybrid period MP21, each length of the second DC period D2a to the second DC period D2c, the second AC period A2a, and the second AC period A2b was the same as each length of the first DC period D1a to the first DC period D1c, the first AC period A1a, and the first AC period A1b shown in Table 1. In the fourth hybrid period MP22, each length of the second AC period A2c to the second AC period A2e, the second DC period D2d, and the second DC period D2e was the same as each length of the first AC period A1c to the first AC period A1e, the first DC period D1d, and the first DC period Die shown in Table 2.

Figure 13:
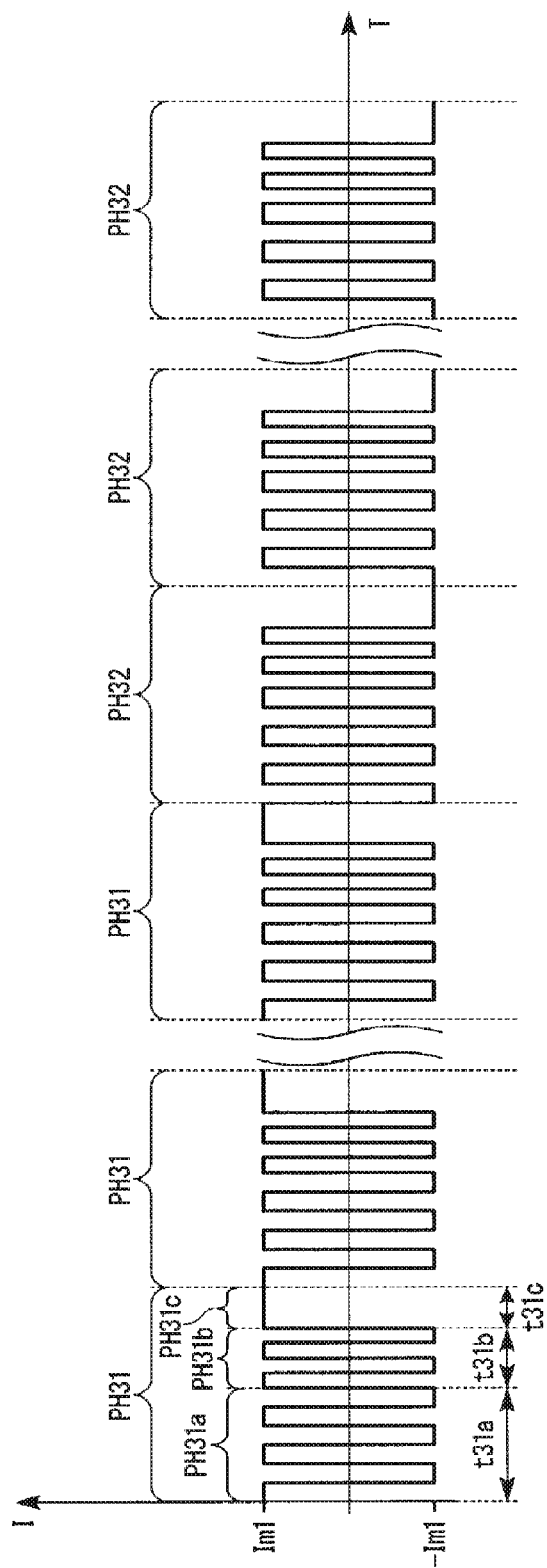
FIG. 13 is a graph illustrating a driving current waveform according to a comparative example.

In Comparative Example 1, the driving current I having a driving current waveform illustrated in FIG. 13 was supplied to the discharge lamp. FIG. 13 is a graph illustrating a driving current waveform in Comparative Example 1. In FIG. 13, a longitudinal axis expresses the driving current I, and a transverse axis expresses time T. In FIG. 13, the driving current I is illustrated to be positive in a case of the first polarity state, and is illustrated to be negative in a case of the second polarity state.

As illustrated in FIG. 13, the driving current waveform in Comparative Example 1 alternately includes a plurality of first comparison periods PH31 sequentially provided and a plurality of second comparison periods PH32 sequentially provided. Each of the first comparison periods PH31 has an AC period PH31a, an AC period PH31b, and a DC period PH31c in this order. The AC period PH31a and the AC period PH31b are periods in which an AC current having a value of the driving current I alternately changed between Im1 and −Im1 is supplied to the discharge lamp. The DC period PH31c is a period in which a DC current having a value of the driving current I maintained to be constant as Im1 is supplied to the discharge lamp.

In Comparative Example 1, a frequency of the AC current in the AC period PH31a was 200 Hz. A length t31a of the AC period PH31a was set to a length corresponding to three cycles of the AC current with 200 Hz, that is, 15 milliseconds (ms). In Comparative Example 1, a frequency of the AC current in the AC period PH31b was 190 Hz. A length t31b of the AC period PH31b was set to a length corresponding to two cycles of the AC current with 190 Hz, that is, 11 milliseconds (ms). A length t31c of the DC period PH31c was set to 5 milliseconds (ms).

In Comparative Example 2, an AC current with a frequency of 200 Hz was supplied to the discharge lamp.

In each of Example and Comparative Examples 1 and 2, a blackening state of the light emitting tube was observed when the discharge lamp was lit for 2000 hours (h) with driving power of 200 W, and a devitrification area [mm$^2$] of devitrification occurring in the light emitting tube was measured. Table 3 shows results thereof.

TABLE 3

|  | Presence or absence of blackening | Devitrification area [mm$^2$] |
|---|---|---|
| Example | Absent | 0 |
| Comparative Example 1 | Present | 11 |
| Comparative Example 2 | Present | 18 |

It was confirmed from Table 3 that devitrification and blackening occur in Comparative Examples 1 and 2, and devitrification and blackening do not occur in Example. Devitrification started to occur at a time point at which 1500 hours (h) elapsed in Comparative Example 1, and devitrification started to occur at a time point at which 550 hours (h) elapsed in Comparative Example 2. Therefore, according to the present example, it was confirmed that the occurrence of devitrification can be prevented. According to the present example, it was also confirmed that the occurrence of blackening can be prevented.

In Comparative Examples 1 and 2, some of light emitted from the discharge lamp is absorbed due to devitrification and blackening, and thus the illuminance of the discharge lamp is reduced. On the other hand, in Example, since devitrification and blackening do not occur, light emitted from the discharge lamp is not absorbed due to devitrification and blackening, and thus the illuminance of the discharge lamp is maintained.

From the above description, it is possible to understand the usefulness of the invention.

The entire disclosure of Japanese Patent Application No. 2016-076369, filed Apr. 6, 2016 is expressly incorporated by reference herein.

What is claimed is:

1. A discharge lamp driving device comprising:
    a discharge lamp driving unit configured to supply a driving current to a discharge lamp provided with a first electrode and a second electrode; and
    a control unit configured to control the discharge lamp driving unit,
    wherein the discharge lamp driving device is configured to provide a first hybrid period and a second hybrid period each alternately including a first AC period in which an AC current is supplied to the discharge lamp and a first DC period in which a DC current with a first polarity is supplied to the discharge lamp, and
    wherein the control unit
        in the first hybrid period, is configured to change a ratio of length of the first DC period to length of the first AC period to be increased, and
        in the second hybrid period, is configured to change a ratio of the length of the first AC period to the length of the first DC period to be increased.

2. The discharge lamp driving device according to claim 1,
    wherein the control unit is configured to change the length of the first DC period to be increased in the first hybrid period.

3. The discharge lamp driving device according to claim 1,
    wherein the control unit is configured to change the length of the first AC period to be increased in the second hybrid period.

4. The discharge lamp driving device according to claim 1,
   wherein, in the first hybrid period, the length of the first DC period is equal to or larger than the length of the first AC period.

5. The discharge lamp driving device according to claim 1,
   wherein, in the second hybrid period, the length of the first AC period is equal to or larger than the length of the first DC period.

6. The discharge lamp driving device according to claim 1,
   wherein the second hybrid period is provided sequentially right after the first hybrid period.

7. The discharge lamp driving device according to claim 1,
   wherein a period initially provided and a period provided last in the first hybrid period are the first DC period, and
   wherein a period initially provided and a period provided last in the second hybrid period are the first AC period.

8. The discharge lamp driving device according to claim 1,
   wherein the discharge lamp driving device is configured to provide a third hybrid period and a fourth hybrid period each alternately including a second AC period in which an AC current is supplied to the discharge lamp and a second DC period in which a DC current with a second polarity opposite to the first polarity is supplied to the discharge lamp, and
   wherein the control unit
       in the third hybrid period, is configured to change a ratio of length of the second DC period to length of the second AC period to be increased, and
       in the fourth hybrid period, is configured to change a ratio of the length of the second AC period to the length of the second DC period to be increased.

9. The discharge lamp driving device according to claim 8,
   wherein the discharge lamp driving device is configured to alternately provide
       a first period composed of the first hybrid period and the second hybrid period, the second hybrid period provided sequentially right after the first hybrid period, and
       a second period composed of the third hybrid period and the fourth hybrid period, the fourth hybrid period provided sequentially right after the third hybrid period.

10. A projector comprising:
    a discharge lamp configured to emit light;
    the discharge lamp driving device according to claim 1;
    a light modulation device configured to modulate light emitted from the discharge lamp according to an image signal; and
    a projection optical system configured to project light modulated by the light modulation device.

11. A projector comprising:
    a discharge lamp configured to emit light;
    the discharge lamp driving device according to claim 2;
    a light modulation device configured to modulate light emitted from the discharge lamp according to an image signal; and
    a projection optical system configured to project light modulated by the light modulation device.

12. A projector comprising:
    a discharge lamp configured to emit light;
    the discharge lamp driving device according to claim 3;
    a light modulation device configured to modulate light emitted from the discharge lamp according to an image signal; and
    a projection optical system configured to project light modulated by the light modulation device.

13. A projector comprising:
    a discharge lamp configured to emit light;
    the discharge lamp driving device according to claim 4;
    a light modulation device configured to modulate light emitted from the discharge lamp according to an image signal; and
    a projection optical system configured to project light modulated by the light modulation device.

14. A projector comprising:
    a discharge lamp configured to emit light;
    the discharge lamp driving device according to claim 5;
    a light modulation device configured to modulate light emitted from the discharge lamp according to an image signal; and
    a projection optical system configured to project light modulated by the light modulation device.

15. A projector comprising:
    a discharge lamp configured to emit light;
    the discharge lamp driving device according to claim 6;
    a light modulation device configured to modulate light emitted from the discharge lamp according to an image signal; and
    a projection optical system configured to project light modulated by the light modulation device.

16. A projector comprising:
    a discharge lamp configured to emit light;
    the discharge lamp driving device according to claim 7;
    a light modulation device configured to modulate light emitted from the discharge lamp according to an image signal; and
    a projection optical system configured to project light modulated by the light modulation device.

17. A projector comprising:
    a discharge lamp configured to emit light;
    the discharge lamp driving device according to claim 8;
    a light modulation device configured to modulate light emitted from the discharge lamp according to an image signal; and
    a projection optical system configured to project light modulated by the light modulation device.

18. A projector comprising:
    a discharge lamp configured to emit light;
    the discharge lamp driving device according to claim 9;
    a light modulation device configured to modulate light emitted from the discharge lamp according to an image signal; and
    a projection optical system configured to project light modulated by the light modulation device.

19. A discharge lamp driving method for supplying a driving current to a discharge lamp provided with a first electrode and a second electrode and driving the discharge lamp, the method comprising:
    supplying the discharge lamp with the driving current having a first hybrid period and a second hybrid period each alternately including a first AC period in which an AC current is supplied to the discharge lamp and a first DC period in which a DC current with a first polarity is supplied to the discharge lamp, wherein in the first hybrid period, a ratio of length of the first DC period to length of the first AC period is changed to be increased, and wherein in the second hybrid period, a ratio of the length of the first AC period to the length of the first DC period is changed to be increased.

* * * * *